United States Patent
Fenchel et al.

(10) Patent No.: US 11,755,915 B2
(45) Date of Patent: Sep. 12, 2023

(54) SYSTEM AND METHOD FOR QUALITY ASSURANCE OF MEDIA ANALYSIS

(71) Applicant: ZIGNAL LABS, INC., San Francisco, CA (US)

(72) Inventors: Jeffrey Fenchel, San Francisco, CA (US); Andras Benke, Bellevue, WA (US); Alex Smith, Chadron, NE (US); Michael Kramer, San Francisco, CA (US); Loretta Jimenez, San Francisco, CA (US); Fabien Vives, San Francisco, CA (US); Julian Alcala, Berkeley, CA (US); Jonathan R Dodson, San Francisco, CA (US)

(73) Assignee: ZIGNAL LABS, INC., San Francisco, CA (US)

( * ) Notice: Subject to any disclaimer, the term of this patent is extended or adjusted under 35 U.S.C. 154(b) by 1066 days.

(21) Appl. No.: 16/438,751

(22) Filed: Jun. 12, 2019

(65) Prior Publication Data
US 2019/0385062 A1    Dec. 19, 2019

Related U.S. Application Data

(60) Provisional application No. 62/684,210, filed on Jun. 13, 2018.

(51) Int. Cl.
| | | |
|---|---|---|
| *G06N 3/084* | (2023.01) | |
| *G06F 16/483* | (2019.01) | |
| *G06N 3/04* | (2023.01) | |
| *G06Q 30/0251* | (2023.01) | |
| *G06Q 50/00* | (2012.01) | |

(Continued)

(52) U.S. Cl.
CPC ........... *G06N 3/084* (2013.01); *G06F 16/483* (2019.01); *G06N 3/04* (2013.01); *G06Q 10/0639* (2013.01); *G06Q 30/0271* (2013.01); *G06Q 50/01* (2013.01); *G06F 40/289* (2020.01)

(58) Field of Classification Search
CPC ........ G06N 3/084; G06N 3/04; G06N 3/0445; G06N 3/0454; G06F 16/483; G06F 40/289; G06F 16/35; G06Q 10/0639; G06Q 30/0271; G06Q 50/01
See application file for complete search history.

(56) References Cited

U.S. PATENT DOCUMENTS

| | | |
|---|---|---|
| 8,326,880 B2 | 12/2012 | Carson, Jr. |
| 8,464,346 B2 | 6/2013 | Barai |

(Continued)

FOREIGN PATENT DOCUMENTS

| | | |
|---|---|---|
| CN | 101404658 | 4/2009 |
| CN | 101404658 B | 11/2011 |

(Continued)

OTHER PUBLICATIONS

Office Action (Final Rejection) dated Jul. 25, 2022 for U.S. Appl. No. 17/224,224 (pp. 1-29).

(Continued)

*Primary Examiner* — Florian M Zeender
*Assistant Examiner* — Karma A El-Chanti
(74) *Attorney, Agent, or Firm* — GRAESER ASSOCIATES INTERNATIONAL INC.; Dvorah Graeser

(57) ABSTRACT

A system and method for data curation, which enables multimedia content, such as social media postings, to be analyzed automatically and accurately.

25 Claims, 18 Drawing Sheets

(51) Int. Cl.
*G06Q 10/0639* (2023.01)
*G06F 40/289* (2020.01)

(56) References Cited

U.S. PATENT DOCUMENTS

| | | | |
|---|---|---|---|
| 8,719,283 | B2 | 5/2014 | Koski |
| 8,892,523 | B2 | 11/2014 | Amarendran |
| 8,949,263 | B1* | 2/2015 | Rosner .................... G06F 16/35 707/758 |
| 8,955,129 | B2 | 2/2015 | Cao |
| 9,037,464 | B1 | 5/2015 | Mikolov |
| 9,043,417 | B1 | 5/2015 | Jones |
| 9,077,744 | B2 | 7/2015 | Beutel |
| 9,191,411 | B2 | 11/2015 | Foster |
| 9,213,997 | B2 | 12/2015 | Chatterjee |
| 9,659,185 | B2 | 5/2017 | Elovici |
| 9,762,596 | B2 | 9/2017 | Wang |
| 9,852,111 | B2 | 12/2017 | Dasgupta |
| 9,886,501 | B2 | 2/2018 | Krishnamurthy |
| 2008/0307526 | A1 | 12/2008 | Chung |
| 2011/0134137 | A1 | 6/2011 | Lee |
| 2012/0101965 | A1 | 4/2012 | Hennig |
| 2013/0124556 | A1 | 5/2013 | Chowdhury |
| 2013/0151525 | A1 | 6/2013 | Ankan |
| 2013/0232263 | A1 | 9/2013 | Kelly |
| 2014/0214840 | A1 | 7/2014 | Gupta |
| 2014/0317736 | A1 | 10/2014 | Cao |
| 2014/0358930 | A1 | 12/2014 | Lerman |
| 2015/0154305 | A1 | 6/2015 | Lightner |
| 2015/0188941 | A1 | 7/2015 | Boshmaf |
| 2015/0264068 | A1 | 9/2015 | Beauchesne |
| 2015/0310862 | A1 | 10/2015 | Dauphin |
| 2015/0324707 | A1 | 11/2015 | Zhou |
| 2015/0339477 | A1 | 11/2015 | Abrams |
| 2016/0019324 | A1 | 1/2016 | Kanderian |
| 2016/0042276 | A1 | 2/2016 | Lightner |
| 2016/0162538 | A1 | 6/2016 | Basson |
| 2018/0005131 | A1 | 1/2018 | Yin |
| 2018/0046475 | A1 | 2/2018 | Wei |
| 2018/0089152 | A1* | 3/2018 | Maksak .................. G10L 25/30 |
| 2018/0114136 | A1* | 4/2018 | Kumar .................... G06N 20/00 |
| 2018/0176168 | A1* | 6/2018 | Tsou .................... G06F 21/6245 |
| 2018/0232359 | A1* | 8/2018 | Crudele .................. G06F 40/30 |
| 2018/0293607 | A1 | 10/2018 | Huddleston |
| 2018/0322411 | A1* | 11/2018 | Wang ...................... G06F 16/35 |
| 2018/0329985 | A1 | 11/2018 | Bao |
| 2019/0014148 | A1 | 1/2019 | Foster |
| 2019/0026367 | A1* | 1/2019 | Boss .................... G06F 16/7844 |
| 2019/0332694 | A1* | 10/2019 | Tcherechansky ..... G06F 16/634 |
| 2019/0332849 | A1 | 10/2019 | Gupta |
| 2019/0370440 | A1* | 12/2019 | Gu ........................ G06N 3/0481 |
| 2020/0012919 | A1 | 1/2020 | Bathaee |
| 2020/0202071 | A1* | 6/2020 | Ghulati .................. G06Q 50/01 |

FOREIGN PATENT DOCUMENTS

| | | |
|---|---|---|
| KR | 101045331 B1 | 6/2011 |
| WO | 2017027320 | 2/2017 |
| WO | 2017027320 A1 | 2/2017 |

OTHER PUBLICATIONS

Office Action (Notice of Allowance and Fees Due (PTOL-85)) dated Feb. 4, 2022 for U.S. Appl. No. 16/452,640 (pp. 1-13).
Office Action dated Oct. 29, 2020 for U.S. Appl. No. 16/580,098 (pp. 1-27).
Kevin, WebGL Lesson One: Getting Started, posted on Jun. 26, 2011 on https://www.learnopengles.com/ webgl-lesson-one-getting-started/, accessed on Oct. 24, 2020, 12 pages. (Year: 2011).
https://medium.com/@gautam.karmakar/manhattan-lstm-model-for-text-similarity-2351f80d72f1 (published Mar. 31, 2018 by Gautam Karmakar, Medium.com), 7 pages.
Mikolov et al ("Efficient Estimation of Word Representations in Vector Space"; Arxiv Sep. 7, 2013), 12 pages.
Mikolov et al ("Distributed Representations of Words and Phrases and their Compositionality"; Arxiv Oct. 16, 2013), 9 pages.
S. Kullback and R. A. Leibler ("On Information and Sufficiency", Ann. Math. Statist., vol. 22, No. 1 (1951), 79-86).
Z. Wu and M. Palmer ("Verb Semantics and Lexical Selection", Arxiv, Jun. 24, 1994), 7 pages.
https://wordnet.princeton.edu/, by Fellbaum, Christiane (first published in 2005), 4 pages.
https://nlp.stanford.edu/projects/glove/, by Pennington et al, first published in Aug. 2014, 3 pages.
A. Conneau, D. Kiela, H. Schwenk, L. Barrault, A. Bordes, Supervised Learning of Universal Sentence Representations from Natural Language Inference Data, Proceedings of the 2017 Conference on Empirical Methods in Natural Language Processing; Sep. 2017, 11 pages.
http://pyvandenbussche.info/2017/translating-embeddings-transe, by Pierre-Yves Vandenbussche, published Aug. 29, 2017, 8 pages.
Cer et al ("Universal Sentence Encoder", https://static.googleusercontent.com/media/research.google.com/en//pubs/archive/46808.pdf, published Mar. 29, 2018), 7 pages.
Gupta et al., "Detection and Characterization of Anomalous Entities in Social Communication Networks", 20th International Conference on Pattern Recognition, ICPR 2010, Istanbul, Turkey, Aug. 23-26, 2010, 738-741.
Notice of Allowance dated Dec. 31, 2020 for U.S. Appl. No. 16/580,098 (pp. 1-5).
Notice of Allowance dated Mar. 17, 2021 for U.S. Appl. No. 16/580,098 (pp. 1-5).
Office Action dated Jun. 28, 2021 for U.S. Appl. No. 16/452,640 (pp. 1-20).
Office Action (Non-Final Rejection) dated Oct. 21, 2021 for U.S. Appl. No. 17/224,224 (pp. 1-22).
He, Qi, et al. "Keep it simple with time: A reexamination of probabilistic topic detection models." IEEE Transactions on Pattern Analysis and Machine Intelligence 32.10: 1795-1808 (Year: 2010).
Lau, Jey Han, Nigel Collier, and Timothy Baldwin. "On-line trend analysis with topic models:# twitter trends detection topic model online." Proceedings of Coling 2012. (Year: 2012) 16 pages.
Newman, David, et al. "Distributed algorithms for topic models." Journal of Machine Learning Research 10.8 (Year: 2009) 28 pages.
Office Action (Notice of Allowance and Fees Due (PTOL-85)) dated Feb. 10, 2023 for U.S. Appl. No. 17/224,224 (pp. 1-2).
Office Action (Notice of Allowance and Fees Due (PTOL-85)) dated Dec. 23, 2022 for U.S. Appl. No. 17/224,224 (pp. 1-11).
Yao, Limin, David Mimno, and Andrew McCallum. "Efficient methods for topic model inference on streaming document collections." Proceedings of the 15th ACM SIGKDD international conference on Knowledge discovery and data mining. (Year: 2009) 9 pages.

* cited by examiner

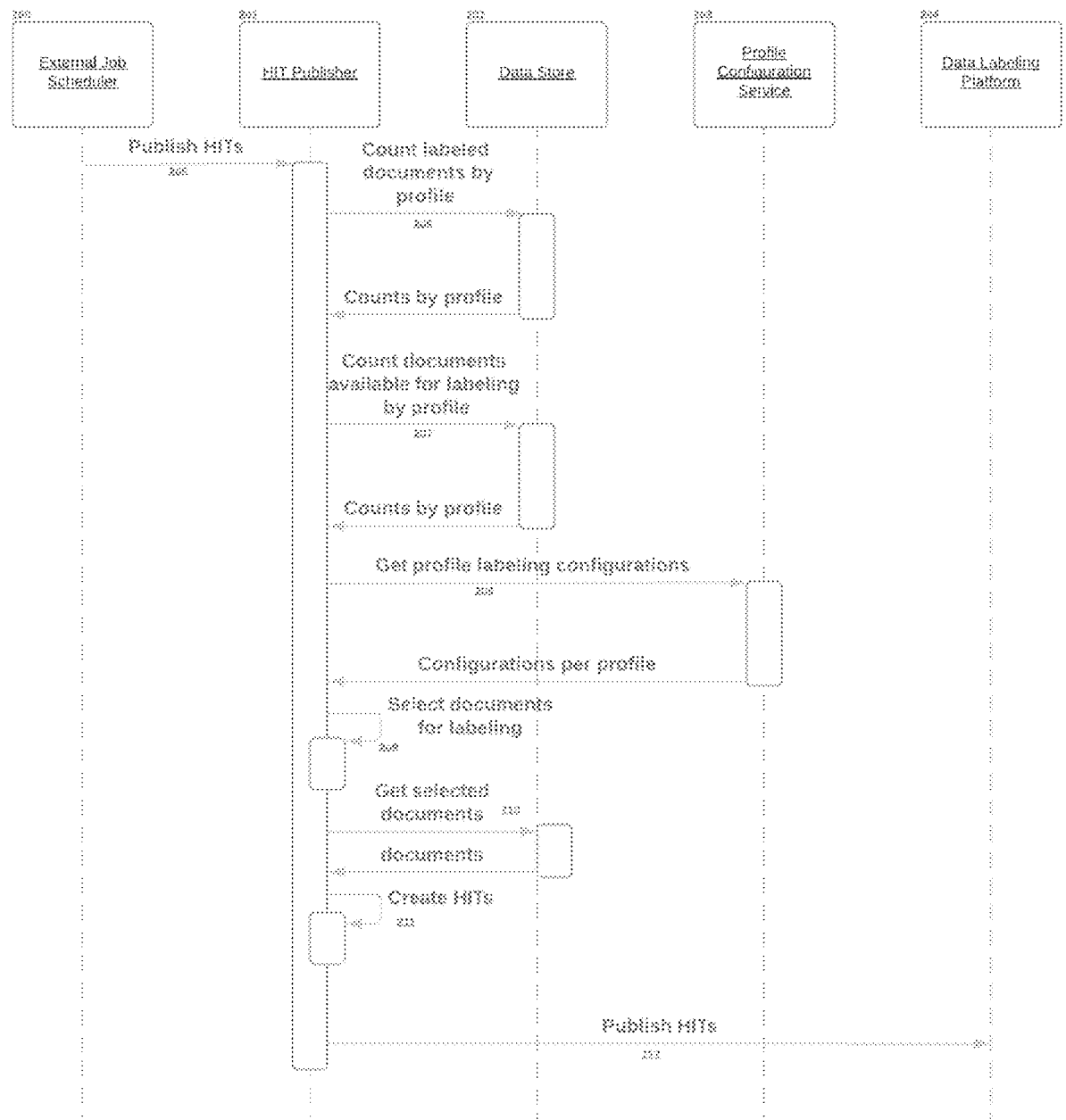

Worker feedback for A10GZ0SWBZIRBK

Jay Gagnon
@JayJGagnon

Harboring fugitives/aiding and abetting as I see it...many of the illegal immigrants' only crime is their presence here without being caught. Many others have defied deportation orders (some multiple times) and that is a federal law felony. Sanctuary enablers are guilty too. twitter.com/realjameswoods...

4:48 AM - Mar 17, 2018

♡ 1  See Jay Gagnon's other Tweets

| Determined Answer | Your Answer |
|---|---|
| negative | neutral |

Athena Cruz
@kjfkugkujvj

Sessions to Oakland Mayor: How Dare You Endanger Lives Just To Promote Your Radical Open Borders Agenda
realclearpolitics.com/video/2018/03/...
California is in a downward spiral, they're ranked 50th in the country, dead Last...in Quality of Life.
Only Democrats can screw-up a State that badly.

9:24 AM - Mar 9, 2018

Sessions to Oakland Mayor: How Dare You ...
US Attorney General Jeff Sessions addressed an event hosted by the California Peace Officers' Association where he delivered a message to
realclearpolitics.com ♡  See Athena Cruz's other Tweets

| Determined Answer | Your Answer |
|---|---|
| negative | neutral |

SYSTEM AND METHOD FOR QUALITY ASSURANCE OF MEDIA ANALYSIS

FIELD OF THE INVENTION

The present invention, in at least some embodiments, is of a system and method for quality assurance of media analysis, and in particular, to such a system and method for creating consistent, curated labeled data for training computer models.

BACKGROUND OF THE INVENTION

Sentiment analysis involves determining the emotions of the author of a piece of content, typically text. It may be used for example for determining the emotions of an author of a social media posting. Brands are particularly interested in sentiment analysis as they wish to determine whether consumers have positive or negative feelings about their products and/or services when these consumers post on social media.

Another area of analysis involves reputation polarity. Reputation polarity relates to the impact of even factual statements on the reputation and/or perception of a brand. For example, "Lehmann Brothers goes bankrupt" is a fact with negative implications for reputation, which would therefore contribute to a negative polarity. Further description of reputation polarity is provided in Amigo et al, "Overview of RepLab 2012: Evaluating Online Reputation Management Systems", CLEF2012 Working Notes, vol 1178, which is hereby incorporated by reference as if fully set forth herein.

One significant issue with such analyses is the problem of consistent data. Social media postings are written by human beings and so involve all of the complexity of human communication. In addition, social media postings may involve sarcasm and other emotionally laden text, which can be difficult to analyze automatically.

BRIEF SUMMARY OF THE INVENTION

The background art fails to provide a solution to the problem of analyzing human communication, such as social media postings, in order to automatically and accurately determine reputation polarity.

The present invention overcomes these drawbacks of the background art by providing a system and method for data curation, which enables multimedia content, such as social media postings, to be analyzed automatically and accurately.

Reputation polarity analysis is preferably performed on data from a variety of sources, more preferably social media channel data, including but not limited to Facebook, Twitter and the like. Data is ingested in real time into a multi tenant customer store. Streams of multimedia data are tracked in the data store that are important to the brands, called profiles. For each of these profiles, a baseline number of documents is maintained, labeled for sentiment over a particular period of time. These documents are labeled accurately through a crowd sourced process that also features automatic analysis of the results. Accurately labeled documents may in turn be used to accurately train models for automatic reputation polarity analysis.

Non-limiting examples of models that may be used for the various processes described herein may be selected from the group consisting of recurrent and convolutional neural networks.

Optionally each method, flow or process as described herein may be described as being performed by a computational device which comprises a hardware processor configured to perform a predefined set of basic operations in response to receiving a corresponding basic instruction selected from a predefined native instruction set of codes, and memory. Each function described herein may therefore relate to executing a set of machine codes selected from the native instruction set for performing that function.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Although the present invention is described with regard to a "computing device", a "computer", or "mobile device", it should be noted that optionally any device featuring a data processor and the ability to execute one or more instructions may be described as a computer, including but not limited to any type of personal computer (PC), a server, a distributed server, a virtual server, a cloud computing platform, a cellular telephone, an IP telephone, a smartphone, or a PDA (personal digital assistant). Any two or more of such devices in communication with each other may optionally comprise a "network" or a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings:

FIGS. 1A-1C show an exemplary, illustrative system and processes for supporting worker labeling of documents according to at least some embodiments of the present invention;

FIG. 2 shows an exemplary, illustrative method for job scheduling according to at least some embodiments of the present invention;

FIG. 10 relates to a non-limiting example of a twitter reputation polarity labeling task according to at least some embodiments of the present invention;

FIG. 12 relates to a non-limiting example of a labeling worker message;

FIG. 13 relates to a non-limiting example of a labeling worker feedback page;

DESCRIPTION OF AT LEAST SOME EMBODIMENTS

Sentiment analysis, and more preferably reputation polarity analysis, is preferably performed on data from a variety of sources, more preferably social media channel data, including but not limited to Facebook, Twitter and the like. Data is ingested in real time into a multi tenant customer store. Streams of multimedia data are tracked in the data store that are important to the brands, called profiles. For each of these profiles, a baseline number of documents is maintained, labeled for sentiment over a particular period of time, such as for example the last 90 days. Additionally, periodically, and preferably daily, a coverage metric is provided by source to the monitoring solution to determine whether the coverage goal is being met. Preferably the coverage goal relates to labeling a certain number of documents per source over a certain duration. As a non-limiting example, a coverage goal could relate to labeling 300 documents over the last 3 months per profile for Twitter. These documents need to be labeled accurately in order for the analysis to be accurate, for example in order to support accurately trained models.

Part of the challenge in crowd labeling data is training the workforce for consistency on evaluation of sentiment in social media postings. Sentiment in this regard preferably does not relate to an emotion of the writer preparing the posting. Sentiment may also not include an intent of the writer preparing the posting. Sentiment preferably comprises the contribution of the posting to the polarity of the brand's reputation; that is, to how people perceive the brand, whether negatively, positively or neutral/indifferently. The posting may include factual information or even only factual information, but may still affect perception of the brand. The term "brand" refers to any person, company, organization or other identifiable entity.

Sentiment preferably includes reputation polarity. Reputation polarity relates to the impact of even factual statements on the reputation and/or perception of a brand. For example, "Lehmann Brothers goes bankrupt" is a fact with negative implications for reputation, which would therefore contribute to a negative polarity. Further description of reputation polarity is provided in Amigo et al, "Overview of RepLab 2012: Evaluating Online Reputation Management Systems", CLEF2012 Working Notes, vol 1178, which is hereby incorporated by reference as if fully set forth herein.

The focus on reputation polarity enables the system to demonstrate how content reflects on the reputation of a brand, organization, or other entity which provides a more polarized perspective over a view of sentiment that focuses on the poster's emotions.

Figure 1A:
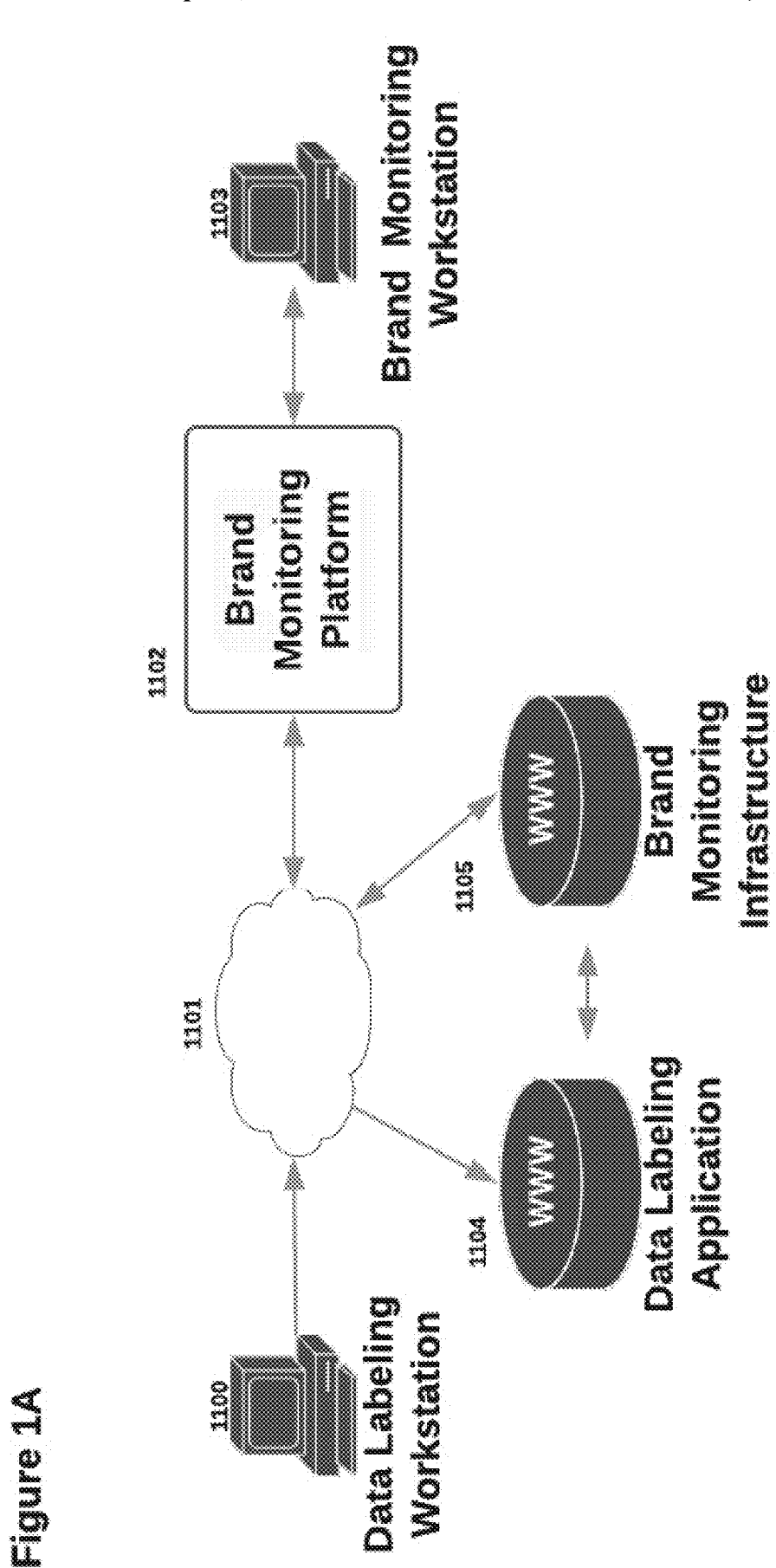

Turning now to the drawings, FIG. 1A shows a system for monitoring sentiment analysis in a plurality of human communications such as for example, social media communications. The system enables data to be labeled manually by human labeling workers in a consistent process, so that the labeled data can be used to train machine learning and/or deep learning algorithms in order to obtain brand insights regarding the social media communications.

As shown, a data labeling work station 1100 communicates through a computer network 1101, which may for example be the internet, with a brand monitoring platform 1102. Brand monitoring platform 1102 preferably comprises a web application, a command center, and other services. These all leverage a brand monitoring infrastructure 1105 to provide insights into evolving conversations.

Brand monitoring platform 1102 in turn communicates with the brand monitoring work station 1103. Also accessible through computer network 1101 is a data labeling application 1104 and brand monitoring infrastructure 1105. Data labeling workstation 1100 enables data to be properly labeled for the output of data labeling application 1104. In turn, properly labeled data enables deep learning components in the brand monitoring infrastructure 1105 to be properly trained. This in turn supports brand monitoring platform 1102 to be able to successfully monitor multimedia communications, including social media postings.

Information is provided to the brand monitoring user through brand monitoring workstation 1103, which also enables the brand monitoring user to make changes to the platform and its operation. For example, users can build Boolean taxonomies to drive the content that is brought into the platform. Additionally there are more fine grained controls such as increasing the number of documents that are manually labeled and used as training data for sentiment analysis from a particular data stream driven by a taxonomy.

Figure 1B:
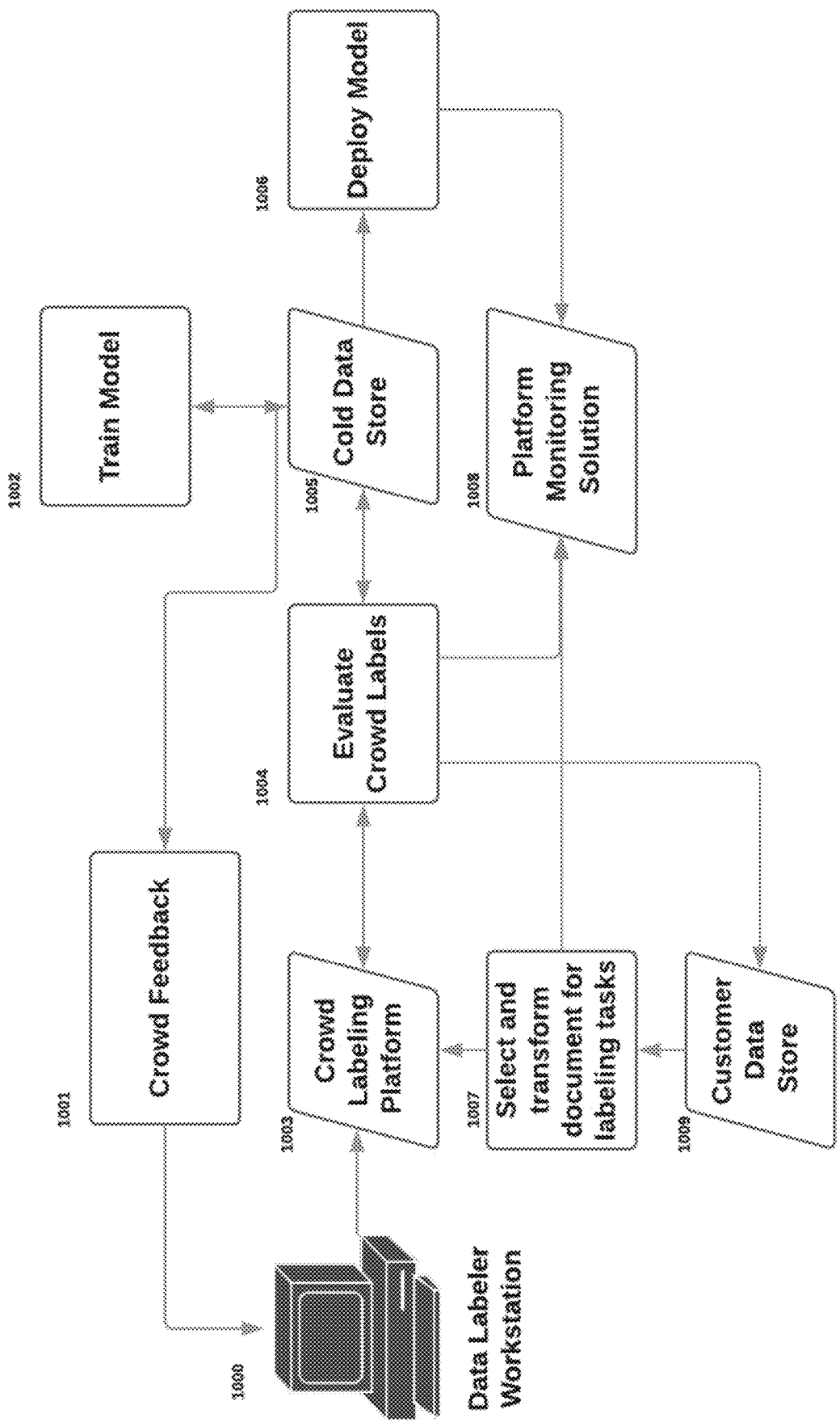

FIG. 1B shows the flow for performing data labeling. As shown, with regard to data labeler workstation 1000, documents are delivered individually through the labelling application (not shown) supported by data labeler workstation 1000, for the human labelers to evaluate and label.

The results of the data labeling application are delivered to a crowd labeling platform 1003, which enables a plurality of labeling users to deliver labeled data from their respective workstations 1000, and to access the data for labeling. In

1003, the crowd labeling platform hosts individual tasks for the reputation polarity labeling and allows workers to find and select tasks to work on.

Next the crowd labels are evaluated in 1004 for example, by determining whether a particular label is used by majority of crowd labelers, or whether to determine according to an analysis that certain crowd labels are clearly incorrect or are clearly correct. Periodically the crowd labeling platform is queried for new labels. These labels are then combined with historical worker labels. With this combined data set, worker specific accuracies and biases are computed and leveraged to derive an inferred label. These inferred labels along with new user specific labels are sent to the cold data store. Additionally worker specific bias and accuracy metrics are sent to the platform monitoring solution 1008.

Next, there's provided a cold data store 1005, where data is stored. This stored data is also used to train the model in a model training process 1002. The labels are retrieved from the cold data store 1005 and a model is trained for both twitter and longform sentiment in 1002. These models are then stored in the cold data store 1005.

The most up to date model is preferably deployed in 1006. The deploy model task checks for a more recent model in the cold data storage 1005. If one is found it updates the existing service to partially route traffic to the new model. Once the new model is proven successful it routes complete traffic to it.

Based on the data that's actually used to train the model in 1002, crowd feedback is provided in 1001, to the data labeling user through data labeler workstation 1000. As part of crowd feedback step 1001, the inferred and worker specific labels are retrieved from the cold data store 1005. These datasets are then preferably compared for each worker, and feedback is organized and rendered into a digestible format. Preferably such feedback is provided so that the workers can adjust their labeling practices going forward to better address a desired reputation polarity use case. For example, the use case may be adjusted by the brand owner.

From evaluating crowd labels in process 1004, also the platform monitoring solution monitors the process in 1008 in order to determine whether or not crowd labels are being done correctly, whether there is a clear majority of data labeling users who indicate that particular labels correct and the like. Metrics concerning the sentiment pipeline are aggregated in the monitoring solution in 1008. This allows for alerting on changes in model quality or labeling quality.

Also, after evaluation crowd labels in 1004, the customer data store is updated in 1009. The customer data store holds documents that have been identified as relevant to specific customers. The customer, which is the brand monitoring end user, may then select and transform the document in labeling tasks 1007. Preferably the initial documents are provided from the customer data store from 1009 to 1007, thereby enabling the crowd labeling platform 1003 to receive the most up to date customer documents.

The customer data store is optionally leveraged in 1007 to select documents to transform and send to the labeling platform. By optionally leveraging the selection of content to be labeled through a selection process by the customer, it is possible to ensure that quality is tracked across all data streams regardless of volume. Additionally this allows for the consideration of individualized customer requirements when selecting documents to label.

Crowd labeling is known to produce poor quality labels. As such preferably additional steps are performed to ensure that the labels are accurate. For example, preferably every task is independently labeled by a plurality of workers, such as five different workers for example. Next expectation maximization is used to assign three scores and find the correct label for each task. For each worker each of the following are preferably tracked: their neutral bias $W_n$, cross polarity accuracy $W_p$, and an overall worker score $W_o$.

For each task i a worker with an assigned score, $W_s \in R$ and provides an evaluation, $W_{ai}$, which can have the values in $E \in \{\text{positive, neutral, negative, multiple polarities, no tweet}\}$. Tasks that are marked as promotional by a worker are considered neutral. The correct evaluation to task i $F_i$ is found through the following:

$$F_i = \operatorname{argmax}\left(\sum_j^j [W_{ai}^j = e] W_s^j \,\middle|\, e \in E\right)$$

The score for worker j is computed through the following equation:

$$W_s^j = \begin{cases} c_1 W_n^j * W_o^j & W_d^j = \text{neutral} \\ W_p^j * W_o^j & W_d^j \in \{\text{positive, negative}\} \\ W_o^j & W_d^j \in \{\text{no tweet, multiple polarities}\} \end{cases}$$

where $c_1$ is a constant that is optimized to adjust the overall neutral bias of the worker pool against desired labels.

The neutral bias for worker j who answered tasks I is calculated by:

$$W_n^j = \frac{\sum_i^I [W_{ai} = \text{neutral}] [F_i \in \{\text{negative, positive}\}]}{\sum_i^I [F_i \in \{\text{negative, positive}\}]}$$

The neutral bias may be described as the number of worker assigned labels that are neutral, multiplied by the total number of labels that are negative or positive, and divided by the total number of labels that are negative or positive. The closer the value is to one, the lower the worker's bias toward assigning items incorrectly as neutral.

The cross polarity accuracy for worker j who answered tasks I is calculated by:

$$W_p^j = \frac{\sum_i^I [W_{ai} \neq F_i][W_{ai} \in \{\text{negative, positive}\}] [F_i \in \{\text{negative, positive}\}]}{\sum_i^I [F_i \in \{\text{negative, positive}\}]}$$

Cross polarity accuracy may be summarized as the sum of the number of incorrectly assigned polarity labels, multiplied by the total number of assigned labels by the worker as negative or positive, and the total number of labels that are negative or positive, and then divided by the total number of labels that are negative or positive. The closer the number is to one, the higher the cross polarity accuracy of the worker.

Finally the overall worker score is simply the worker's macro F1 score with respect to the final evaluations:

$$W_o^j = F_{macro}(W_a, F)$$

The final evaluations and worker scores are found by initializing the cross polarity accuracy scores and neutral bias scores to 1 and then performing expectation maximization between the worker scores and final evaluations until convergence.

FIG. 1C indicates a process in which various sub processes are performed, including worker labeling and worker qualification. On the worker labeling side, the worker selects Twitter tasks at 100. The qualification requirements for the worker to be able to select such tasks and to perform them would be scoring 100% or at least a certain percentage under a reputation polarity test, and also not have exclusion qualifications. The labeling platform allows workers to find tasks that interest them. As such, the labeling process starts when a worker finds the task and decides to begin work on it.

A qualification process 101 determines whether the worker is qualified. The worker's account is checked to make sure it has the correct qualifications for the twitter reputation polarity labeling task, as noted above. There are automatic quality checks in place that add an exclusion to workers who have failed to meet the quality standards.

If the worker is not qualified for a particular task or tasks, then the process ends. If the user is determined to be qualified, then the next sentiment labeling task is loaded in 102. The workstation is shown a single document at a time for labeling. The first document is selected and loaded in 102. The elements in the queue are preferably shuffled and augmented with non customer data to hide the identities of the clients that are being tracked.

As determined at 103, the workstation is given options to exit or label the document. A reputation polarity label is selected in 105. If the minimum evaluation period at 104 is not complete after the selection in 105, the workstation preferably needs to wait the remaining duration before continuing. Optionally the minimum period 104 is required from the initial load of the social media data, such as the twitter document for example, until submitting the reputation polarity label. This helps encourage the workers to spend a base amount of time considering the task. As a non-limiting example, this time period is 5 seconds. Optionally the polarity labels comprise one or more of positive, negative, neutral, unknown, promotional, multiple polarities.

The task is then submitted in 106 and another document is selected and loaded 102.

A loop is then performed until the last task has been loaded. Once the last task is loaded, then as determined at 103, then the labeling process exits. The user may choose to exit the loop and to stop performing tasks at 103 at any time.

Optionally when submitting the results of the labeling task in 106, a separate action is required to submit the label after selecting the appropriate label. This gives the user the chance to ensure they selected the correct label.

If the worker (user) is not qualified, then the worker qualification process is performed first. On the worker qualification side, if the user wishes to perform Twitter tasks, but has not yet been determined to be qualified or unqualified, in process 101, then the user preferably performs one or more test labeling tasks, which are indicated at 109. The user also preferably needs to take reputation polarity tests at 107, receiving instant feedback from automatic test score 108. If necessary, the training is repeated a few times.

Turning now to FIG. 2, an external job scheduler 200 schedules jobs to be performed. A task publisher 201 indicates which tasks are to be published for labeling. Task publisher 201 also contains the logic on how to construct a reputation polarity labeling task and which documents to use for these tasks.

The system includes a data store 202, a profile configuration service 203, and a data labeling platform 204. The profile configuration service 203 provides access to the labeling configuration for each profile. This service is leveraged by other systems in the platform that allow users to build out a profile specifying details about what is being monitored and what features are available in the analytical breakdowns. The data labeling platform 204 is designed to connect the labeling tasks to a workforce as previously described.

The process begins at 205 when the external jobs scheduler 200 sends a request for tasks to task publisher 201.

Next, after publication, task publisher 201 counts labeled documents by profile 206 and stores them in the data store 202. Next, counts by profile are returned as part of this process, and this sub process of 206. 206. Preferably, task publisher 201 obtains the total labeled documents by profile over a preset period of time, such as over the past three months for example. This provides an understanding of what the current coverage is with respect to profiles.

Next, task publisher 201 counts the documents available for labeling by profile in 207, and the counts by profile are returned in a sub part of this process. To make the model more resilient recent data is used when new labeling tasks are submitted. However, not all profiles are active all the time. Consequently, there may not be any data for a particular profile that is selected for labeling. To take this into account the total available data for labeling, which is unlabeled data during the selected recent time frame, is computed.

Task publisher 201 then gets profile labeling configurations at 208 as a request to profile configuration service 203. For some profiles reputation polarity is more important. Additionally there can be areas of focus that are not well covered by the existing labeled data set. In these situations, a brand user can opt in to increase the labeling of documents on specific profiles. This allows them to receive continuous feedback on accuracy, precision and recall metrics around reputation polarity as well as improve the performance of the automatic labeling.

Now, HIT publisher 201 selects documents for labeling in a subtask process 209. This subtask is for selecting documents for labeling which preferably form a particular focus.

In 209, documents are selected for labeling to maintain a baseline standard for labeling a certain number of documents from each profile over a semi recent time frame which is currently three months. This is augmented with profile specific requests. The result of this step is a list of profiles to target numbers of documents for which labels are needed.

After the documents are selected in 210, the data store in a requested data store 202, data store 202 returns the selected documents, and then tasks are created in 211 in a loop process. Next the tasks or hits are published in 212 to data labeling platform 204, where the labeling process may begin.

Figure 3C:
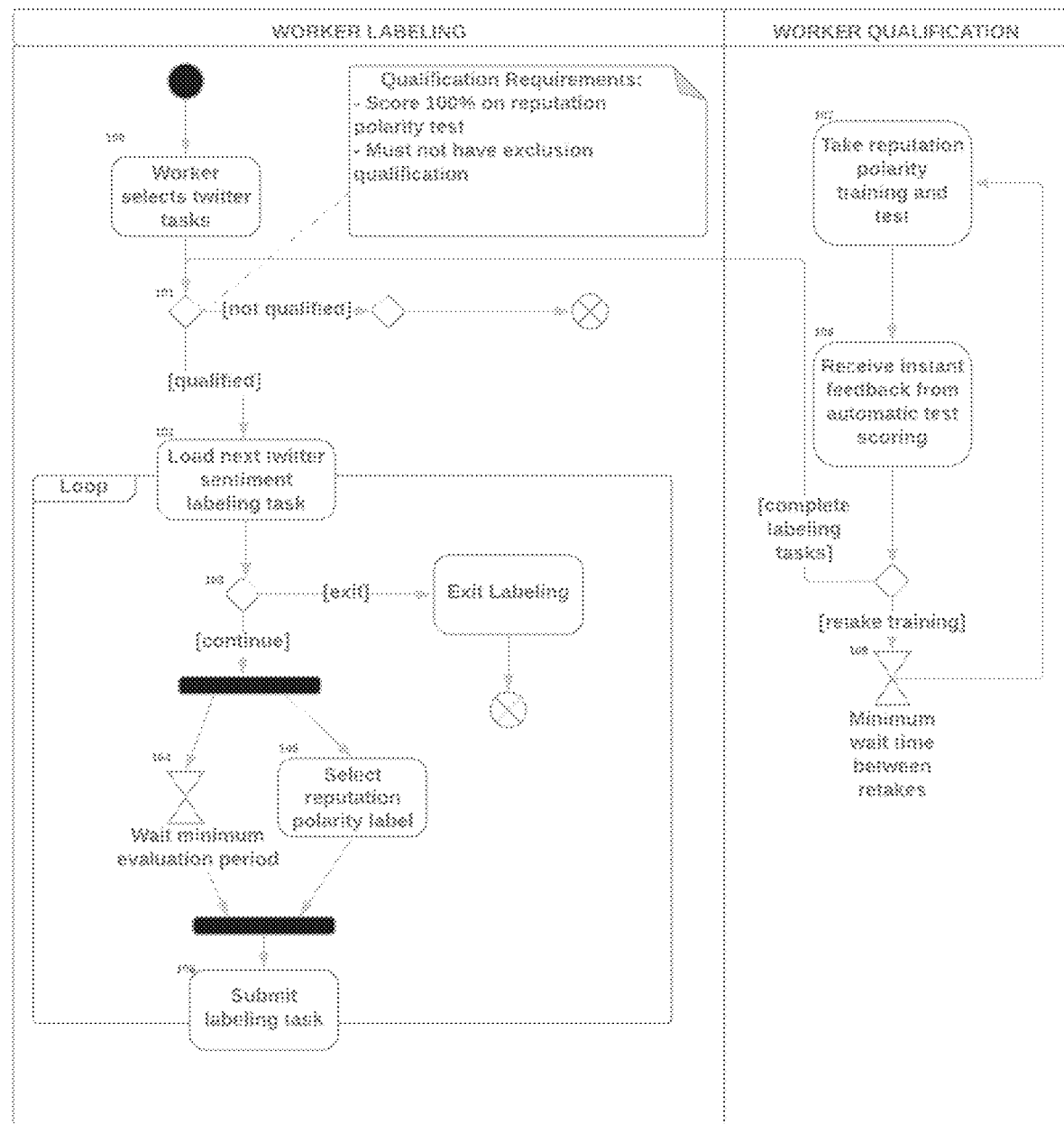
FIG. 3 shows an exemplary, illustrative method for determining a correct label for a document according to at least some embodiments of the present invention.
Figure 3:
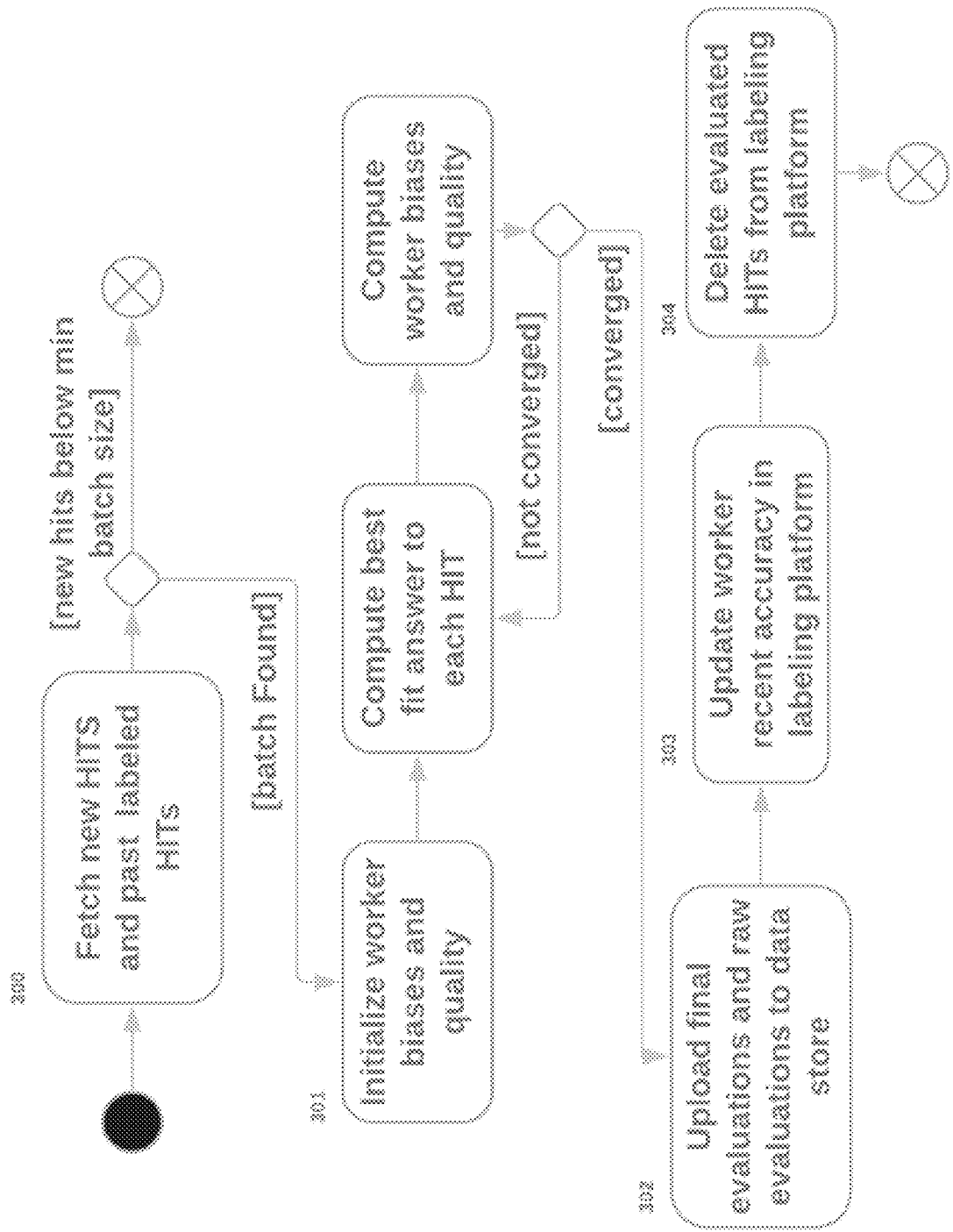

FIG. 3 shows a flow, which starts as new tasks and past label tasks are fetched in 300. If the new tasks are below the batch size, then the process stops until enough tasks are found to be performed for a batch. Newly labeled content and previously labeled content is fetched from the labeling platform and data store. This provides the basis for leveraging the workers responses to infer correct labels for each document. The past content is leveraged to gain additional insights into each worker's individual biases and quality.

Once a batch has been located, then in 301 the worker biases and quality are initiated. The batch is augmented with historical labeled data to aid in computing working quality and biases. The best answer to each task is computed, and worker biases and quality are computed. Preferably this process continues until convergence. Optionally and preferably, convergence is determined to occur when the best fit answers are unchanged between iterations. Preferably convergence occurs within 10 iterations, but may optionally occur within 30 or more iterations. If convergence is not achieved after a set maximum number of iterations, the computed values for worker biases and quality values from the final iteration are used. Expectation maximization is preferably used to simultaneously infer the best fit answers to each task as well as understand the worker's biases and quality. Initially it is assumed that all workers are equal in respect to their quality and biases. The best fit answers are then computed leveraging the understanding of the workers. These answers are then compared to the responses of individual workers. The system's understanding of their quality and biases are updated. This process is then repeated until convergence where there is no change in the best fit answers based on updated knowledge of each worker's biases and quality.

Once convergence has been achieved, then in 302 the final evaluations and raw evaluations are uploaded to the data store, the data recent accuracy for the workers is updated in the labeling platform in 303 and evaluated tasks are deleted from the labeling platform in 304.

Figure 4:
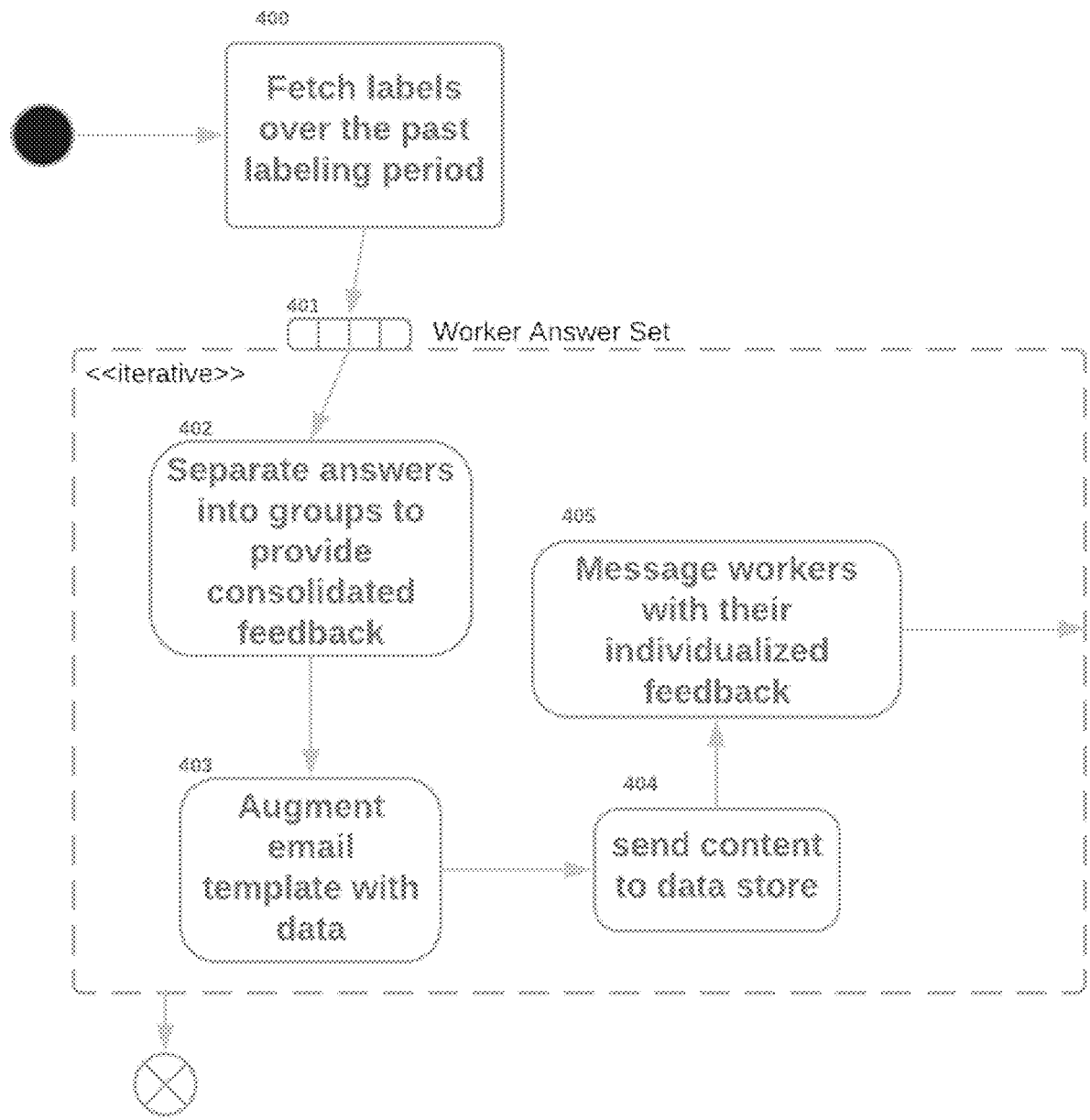
FIG. 4 shows an exemplary, illustrative process for providing worker feedback according to at least some embodiments of the present invention.

FIG. 4 shows a process for providing worker feedback. The process begins when labels are fetched over the past labeling period in 400. The feedback to workers is grouped in segments to allow for clearer emergence of trends within their work. In the current implementation the evaluated labels over the past week are fetched to provide feedback.

This then forms part of a worker answer set 401. The labels are separated into sets for each worker that contain all of their answers and the associated, inferred best fit labels. The following process is repeated for each worker.

Answers are separated to provide consolidated feedback in 402. The labels are separated into lists of types of errors that are made. For example, various examples of cases are provided with errors, for example where the worker selected neutral instead of a positive or negative polarity as well as a list of cases where the worker guessed the incorrect polarity such as negative instead of positive. In addition a list is preferably provided where the worker is correct with respect to the best fit answers to provide positive feedback.

Figure 12:
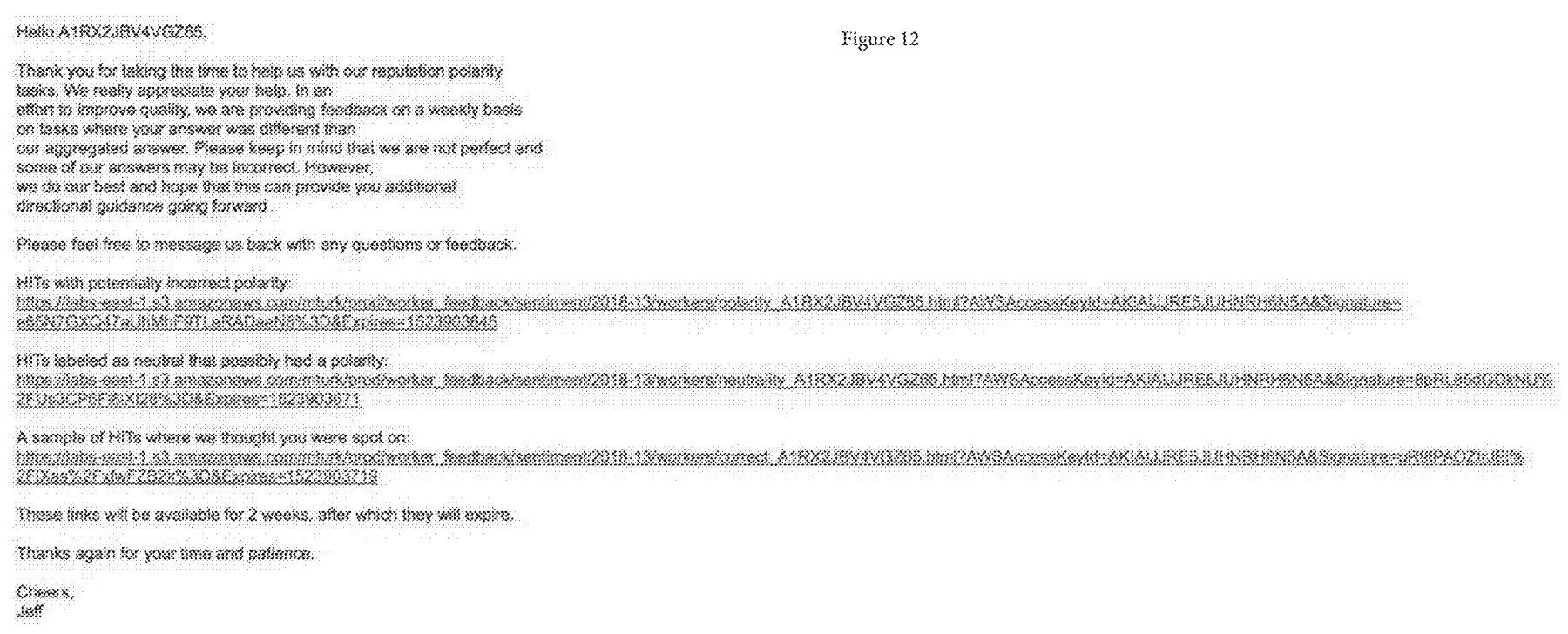

The email template is augmented with data in 403 so that the workers may optionally receive feedback by email. Content is sent to the data store in 404, and workers are messaged with their individualized feedback at 405. FIGS. 12 and 13 give examples of the messages provided to the worker and of a webpage showing various errors made with regard to categorization of online messages.

Figure 5:
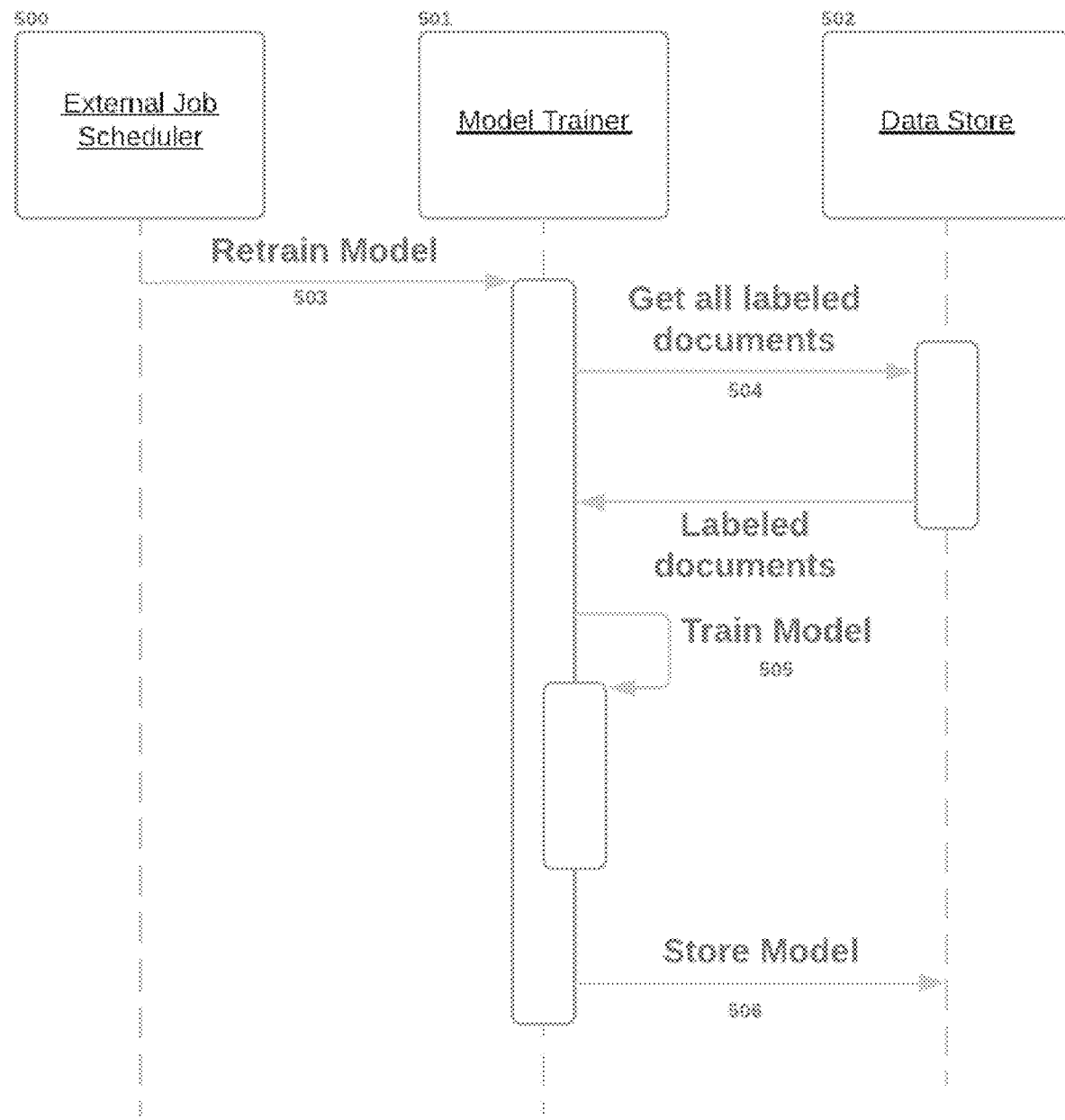
FIG. 5 shows an exemplary, illustrative process for training a model according to at least some embodiments of the present invention.

FIG. 5 shows a process with an external job scheduler 500, a model trainer 501, and a data store 502. External scheduler 500 is configured to start the model training process. This can be done at any interval, but currently the system does this daily.

The external job scheduler 500 indicates the models to be retrained at 503, which preferably happens intermittently and more preferably happens continuously. Retraining preferably occurs with newly labeled data.

Model trainer 501 then obtains all labelled documents in a request 504 to the data store 502, which then returns the labelled documents.

The model is trained in the loop process at 505 by model trainer 501. Now the model is stored in a process 506, at data store 502, by model trainer 501. Process 506 preferably features storing the model in the data store after training, so that it is available for our reputation polarity service for real time data ingestion. A full package is preferably stored for every model describing the inferred weights, the model structure, the word mappings, as well as metadata about the model quality on the validation and test data sets.

Word mappings preferably map the words to index points in word vectors. Each word is considered a one hot vector with the element at that position=1 and all the others=0 in a vector of length equal to the number of words in the vocabulary list. These vectors are mapped to word embeddings, of optionally 300 dimensions for example, that are learned during model training. Optionally the vectors are stored in a more efficient manner.

Figure 6:
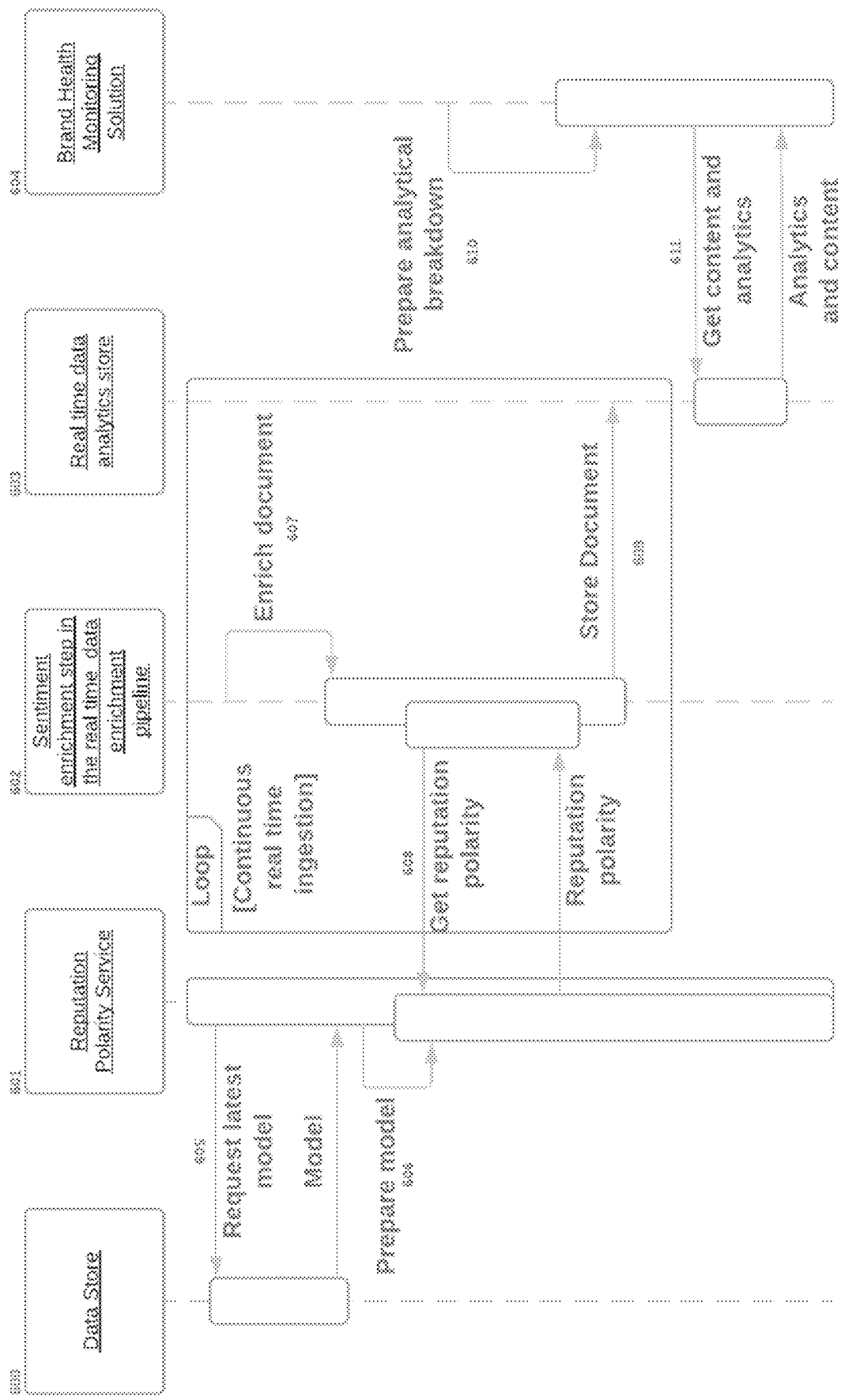
FIG. 6 shows an exemplary, illustrative process for model usage according to at least some embodiments of the present invention.

FIG. 6 shows a process for model usage, featuring data store 600, a reputation polarity service 601, and a sentiment enrichment step in the real time data enrichment pipeline 602. The pipeline 602 adds analytical metadata to documents as they are collected. A real time data analytics store 603, and a brand reputation monitoring service 604 interact in order to perform brand monitoring. Analytics store 603 provides access to the ingested content as well as a platform for running analytical queries on demand. The primary use case of brand reputation monitoring service 604 is to monitor brand reputation. This contains a suite of tools such as smart signage, command centers, and web applications that provide real time insights into conversations around brands.

In a process 605, reputation polarity service 601 requests the latest model from data store 600, which is then transferred into reputation polarity service 601. Now the model is prepared at 606 by reputation polarity service 601, which service loads in the model and starts a rest service to allow access to its automatic reputation polarity evaluations.

As part of a loop, the reputation polarity is requested by sentiment enrichment step 602 in a process 608. One step in the enrichment process is reputation polarity. During this step, the pipeline makes a request to the reputation polarity service with the textual information from the tweet or the profile based highlights from longform content. Reputation polarity is then fed to sentiment enrichment 602.

As the loop continues, the reputation polarity is examined, the document is enriched in a process 607, through continuous real time ingestion. The real time data enrichment pipeline continuously augments documents with additional analytical information.

As the documents are enriched they are stored in their enriched form in a process 609 to real time data analytics store 603. This loop process preferably happens continuously as more documents come in.

As new documents are provided to real time data analytics store 603, brand reputation monitoring solutions 604 prepares an analytical breakdown 610 according to a user initiated request. Some non-limiting examples of such an analysis include determining a time series by sentiment for a profile (data stream driven by taxonomy) and influential authors, top authors by mention count, top sites by mention count, word cloud, emoji cloud for a given sentiment. An analytical breakdown features a plurality of widgets providing analytical value (like those listed) grouped together. While there are many use cases for such analysis, one non-limiting example of such a case is in the preparation of analytical dashboards that provide insights on a brand over a requested time frame.

Next, solutions 604 then gets content and analytics in 611, which are then delivered to brand reputation monitoring and solutions 604. Process 610 indicates the start of the task build out an analytical breakdown; part of that task relates to obtaining content and analytics.

Figure 7:
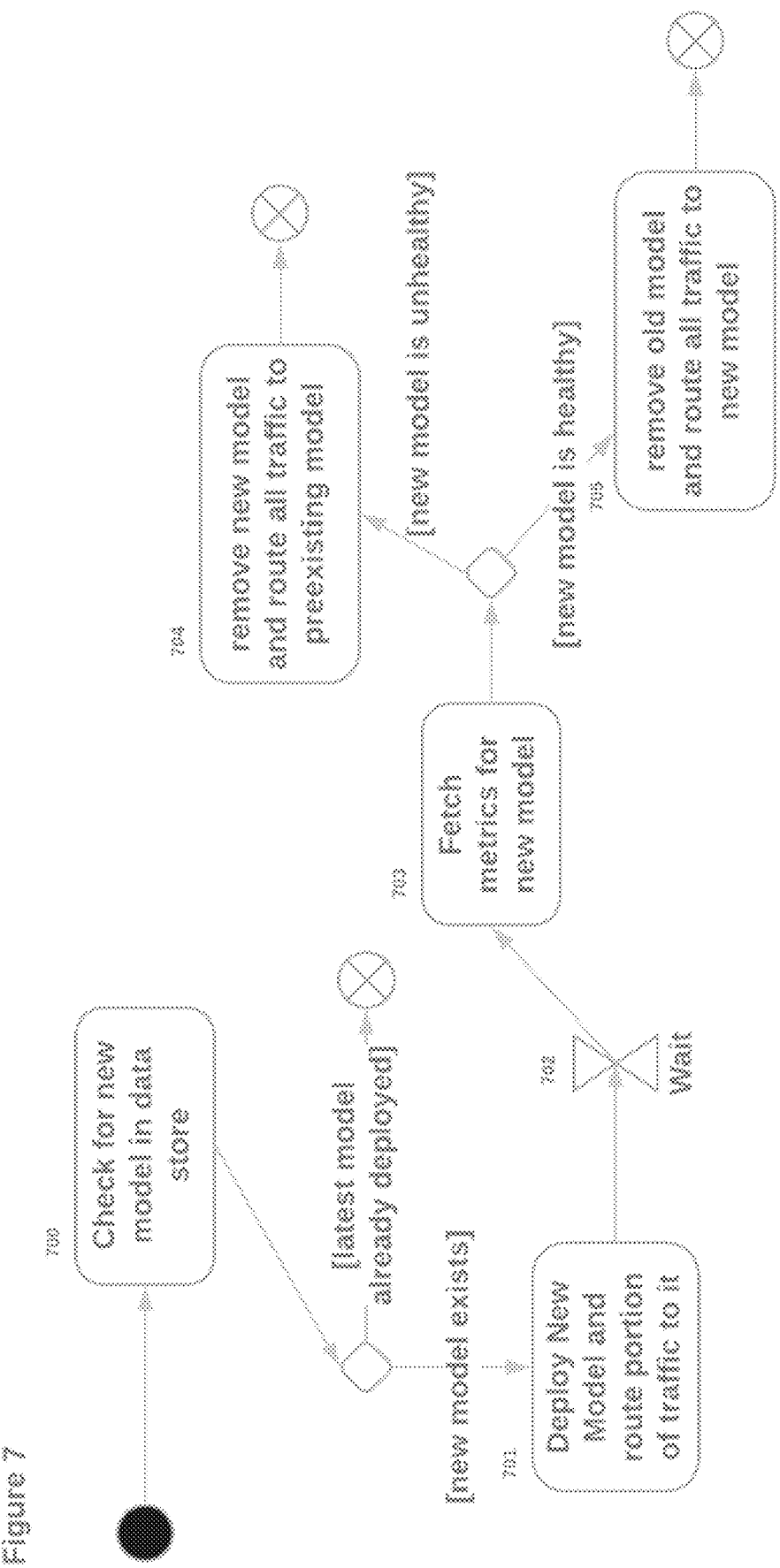
FIG. 7 shows an exemplary, illustrative process for how new models may be used to update a model system for sentiment analysis according to at least some embodiments of the present invention.

FIG. 7 shows how new models may be used to update a model system for sentiment analysis. In a process 700, a new model is checked in the data store. If the latest model is already deployed, then the process ends. Otherwise, if new model exists, then in process 701, the new model is deployed and a portion of the traffic is routed to it.

After waiting for a period of time, which optionally but preferably lasts a predetermined amount of time, preferably at least 5 minutes, more preferably at least 10 minutes, also more preferably at least 15 minutes, new metrics for the model are fetched in 703. If the new model is unhealthy, then the new model is removed and traffic is re-routed to pre-existing models 704 and the process ends. If the new model is healthy, then the old model is removed and traffic is routed to new model in process 705, and then again the process ends.

Figure 8:
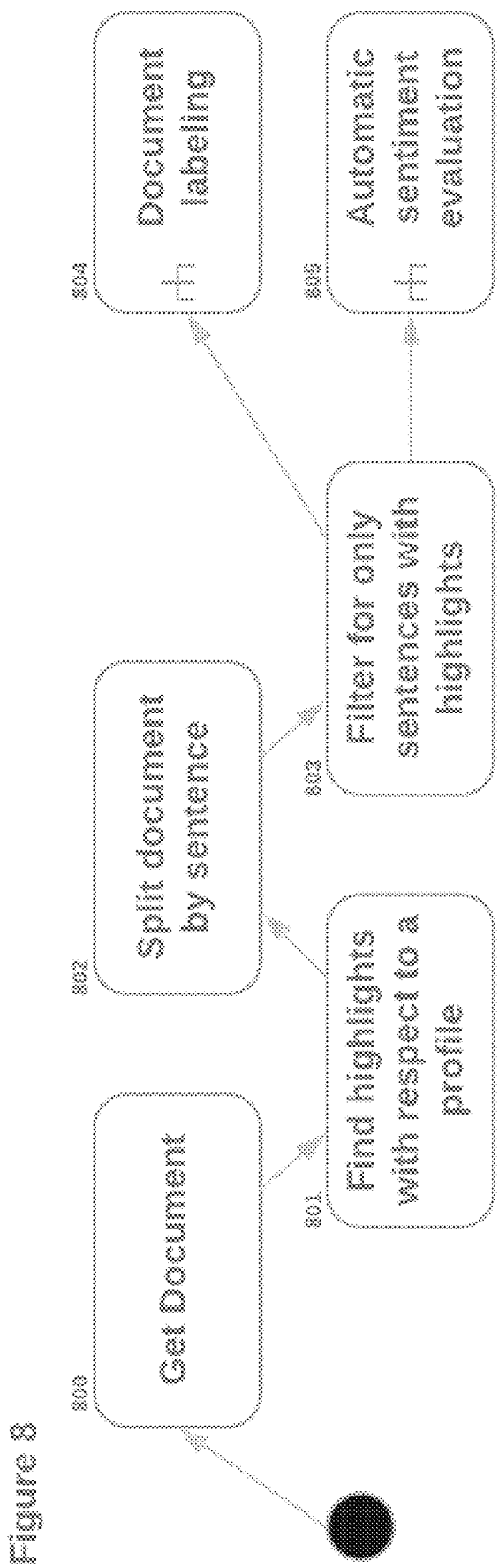
FIG. 8 shows an exemplary, illustrative process for breaking down a document in order to assist with document labeling according to at least some embodiments of the present invention.

FIG. 8 shows a process for breaking down a document in order to assist with document labeling, as part of long form enrichment. As shown, in a process 800, the document is obtained. Long form reputation polarity may for example optionally be performed during the enrichment pipeline where documents are being augmented to provide brand insights in real time. Optionally, additionally or alternatively, the process is performed during the label collection process where documents are being sent to the labeling workforce in order to improve the model with human insights.

Next, highlights are found with respect to a profile in 801. Optionally, only a small portion of the longform document is relevant to the brand that is being monitored. Consequently the Boolean query that defines the scope of what is being monitored is leveraged to find what portion of the document is relevant. Preferably the specific words that match in a document for a given Boolean query are located. For example if a query is (Southwest AND dies) OR (passenger AND alive), then the matching process could pick out the words "southwest" and "dies" in the statement "Southwest passenger dies on flight." Preferably the word "passenger" would not be selected because it does not relate to the Boolean query as defined.

The document is preferably then split sentence by sentence in 802, allowing for a more fine grained evaluation where one can identify independent polarities across multiple expressed ideas. Preferably only sentences with highlights are obtained through a filtering process in 803. Only the sentences that contain highlights and are therefore relevant to the brand being monitored are preferably retained. This allows for aspect based sentiment for the brand.

The document is labeled in 804. Preferably sentences with highlights are leveraged in the document labeling process in order to improve the model used in the real time data enrichment pipeline. Preferably automatic sentiment evaluation is performed in 805. During the real time pipeline reputation polarity enrichment this same process is followed and the results are sent to the reputation polarity service which provides an aspect based sentiment evaluation with respect to the sentences with highlights.

Figure 9A:
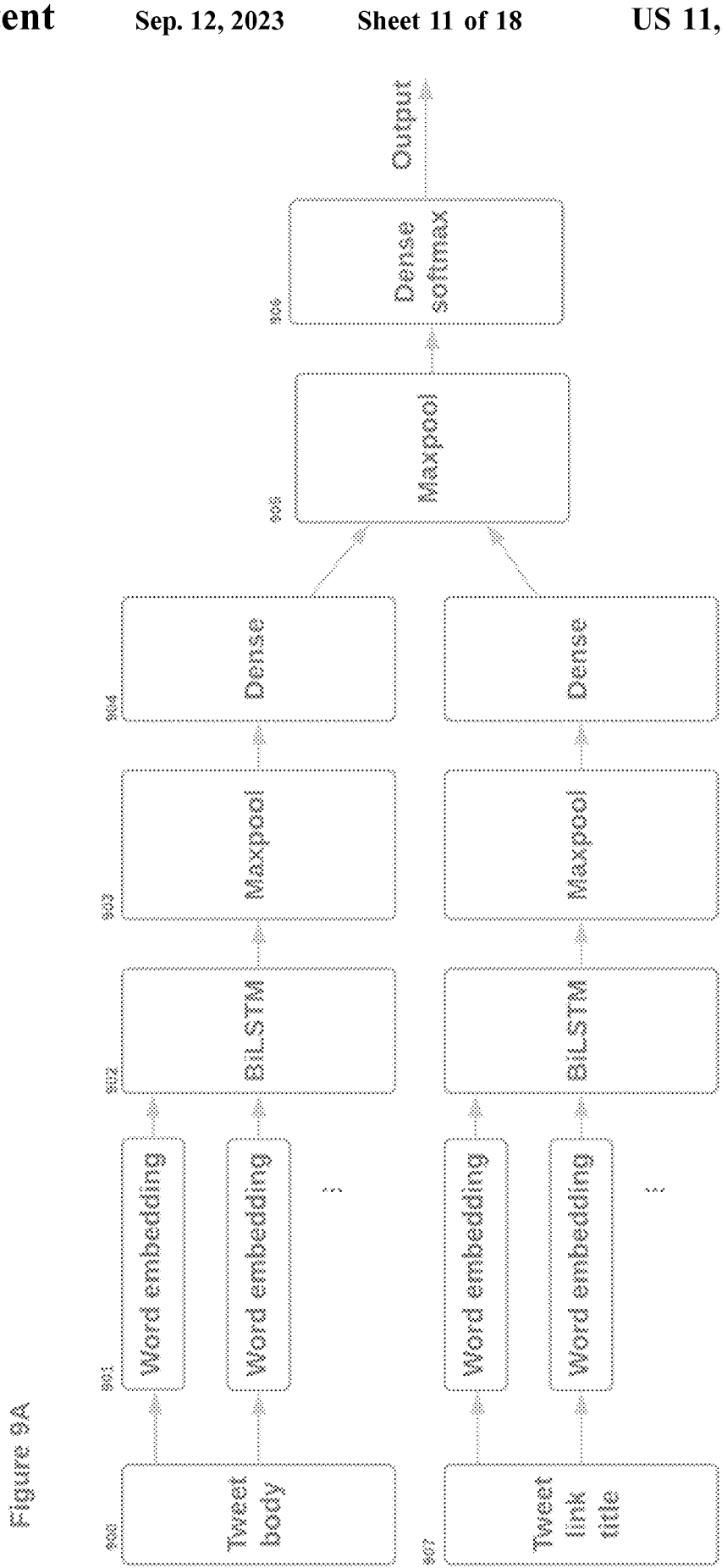
FIGS. 9A and 9B relate to exemplary, illustrative processes for analysis of a document by a model according to at least some embodiments of the present invention.

FIG. 9A shows an analysis process for analyzing a tweet and a tweet linked title. Tweet body 900 is analyzed through word embedding in a step 901. The textual content of the tweet is extracted and used as an input into the classifier. In 901, each word is transformed into a vector representation. In this implementation the representation is initialized using unsupervised learning on a larger corpus. Optionally the process may be performed using publicly available pre-trained GloVe vectors. The Twitter vector was trained on 2 Billion tweets and the news related vector was trained on documents retrieved from a web crawl with 840 billion tokens. Further information is provided in https://nlp.stanford.edu/projects/glove. The vectors are then incorporated and modified during the training phase of the model.

This process of analyzing word embeddings is preferably performed by a machine learning model, which is more preferably a bidirectional LSTM (BiLSTM) or bidirectional long short term memory model 902. As a non-limiting example, the time series of word vectors of length 300 is optionally fed into a BiLSTM of dimension 50. This model accumulates information over the time series of words and produces an output at each step (word) in the time series. The first layer in the BiLSTM takes information from the previous word and transfers that to the next word, while the second layer takes information from the next word and transfers that to the previous word. The output of the second layer is provided to the next step.

The next step is a maxpool 903. The BiLSTM layer has an output at each word in the input for each dimension of the BiLSTM. This information is collapsed by taking the maximum across all words in the input for each dimension of the BiLSTM.

Densification is performed in step 904, in which the output of the maxpool feeds into a typical dense neural network layer using a rectified linear unit for an activation function. Every unit in the maxpool layer is an input to every unit in the dense layer. Each unit learns its own set of weights for each input. The output of each unit is 0, if the sum of the weighted inputs is less than 0. Otherwise the output is equal to the sum of the weighted inputs.

Dropout is also preferably included on top of this layer to help improve model generalization. At each batch of examples, the output error is calculated and backpropogated throughout the model. The weights are then adjusted in the direction of this error. With dropout, a percentage of the weights are randomly frozen at each batch and not updated based on the backpropogated error.

The final maxpool is provided in 905. The subnetworks accepting the twitter body content and link title content are symmetrical. Consequently, their dense layers are of the same dimensionality and are combined using max pooling to take the max value between the two subnetworks at each dimension in the dense layer. For example, if the output of the first dimension of the first subnetwork is 1 and the output of the second subnetwork at the first dimension is 10, the output of the maxpool layer at the first dimension would be 10.

The final layer of the network contains three neurons with linear activation. Softmax is used to find the final evaluation between the three classes: negative, neutral, and positive in 906. The final layer contains three neurons, one for each class. Each neuron has learned weights that are used to weight the inputs. The sum of the weighted inputs is sent through a typical softmax squashing function that translates the output such that the sum across the outputs for the three neurons is 1. The output of the entire model is inferred as the class with the corresponding highest output from the softmax layer.

If the tweet contains a link, the link title is extracted and used as an input. In the case that there is no link title, a placeholder is used instead in 907. For the tweet linked title, a symmetrical process is performed.

Figure 9B:
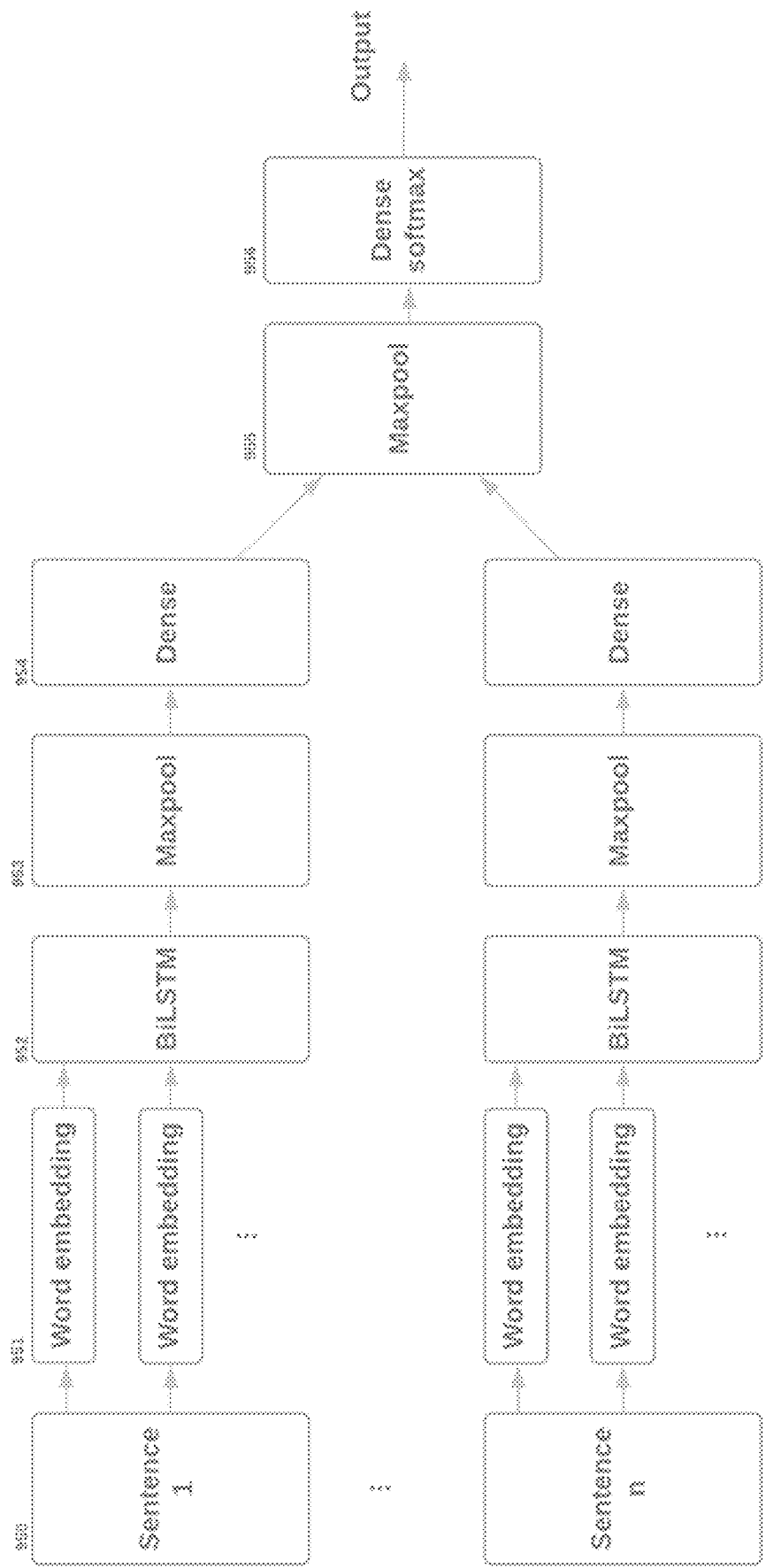

FIG. 9B shows a process for analyzing a long form document with a plurality of sentences, starting from sentence one through sentence "n". The textual content of longform traditional media sources is preferably first broken up into sentences along with the title as the first textual input in 950. The textual inputs without content matching the defining profile query are then discarded and the remaining inputs are used as inputs to the sentiment classification model. Each sentence is preferably analyzed through a word embedding process 951. During 951, each word is transformed into a vector representation. In this implementation the representation is initialized using unsupervised learning on a larger corpus. The vectors are then incorporated and modified during the training phase of the model.

A plurality of segments, such as fifteen or more segments for example, in a document are preferably fed in for a single document and have a single output from the relevant trained model. The process and models are similar between FIGS. 9A and 9B, but input is different and so the output is different. The trained models are different but before training, the algorithms may be the same or at least similar.

This process of analyzing word embeddings is preferably performed as described with regard to FIG. 9A, except that the process involves multiple document segments such as 15 or more segments.

As for FIG. 9A, the final layer of the network contains three neurons with linear activation. Softmax is used to find the final evaluation between the three classes: negative, neutral, and positive in 956.

The training of the neutral network in FIG. 9A is preferably performed in a two step process. Labels are collected both at the individual segment level and at the overall document level. Leveraging this multi-tiered labeling approach, the segment model is first optimized to predict the segment level evaluations. The resulting model is then used in the construction of the multi-segment classifier which is then optimized against the document level evaluations.

Figure 10:
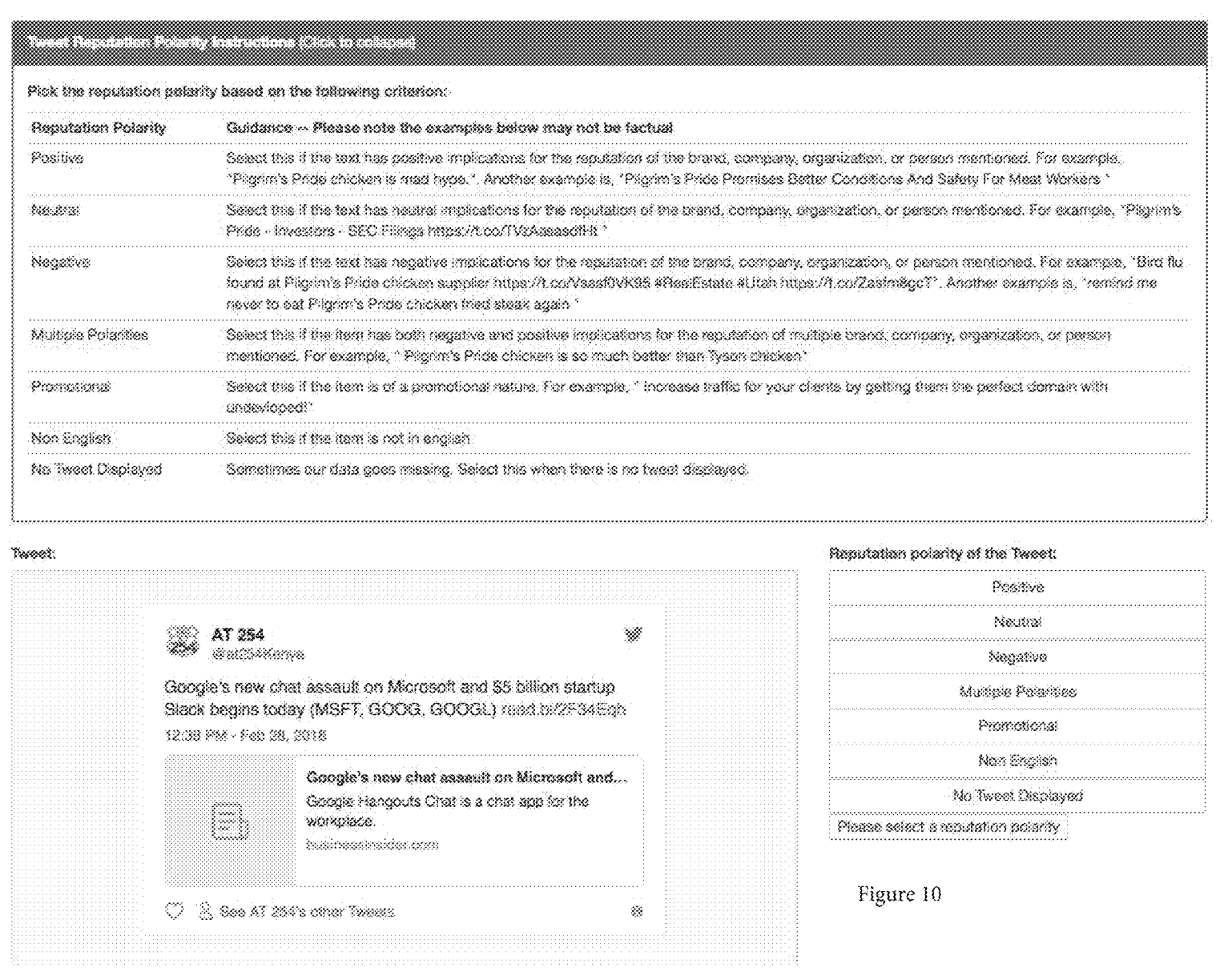

FIG. 10 relates to a non-limiting example of a twitter reputation polarity labeling task, which preferably includes context for each document. As shown, preferably the tweet is shown as displayed on twitter for the crowd workers to evaluate. This allows them to take into account embedding links and images as they make their evaluation.

Figure 11:
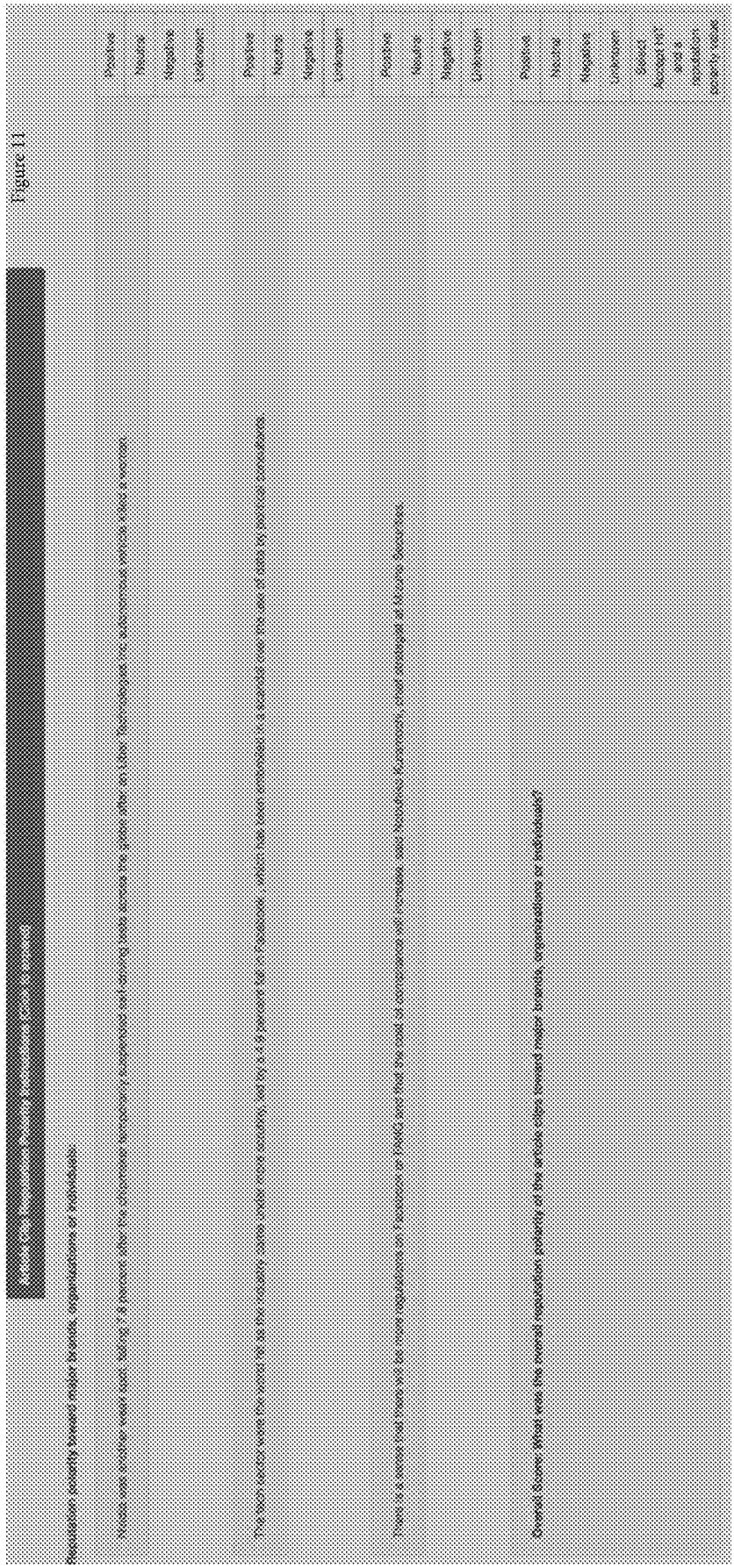
FIG. 11 relates to a non-limiting example of a news/blogs reputation polarity labeling task according to at least some embodiments of the present invention.

FIG. 11 relates to a non-limiting example of a news/blogs reputation polarity labeling task. For longform content such as news and blogs defining a single polarity for a document can be difficult given that there are many different statements, each expressing a unique idea, many of which could be irrelevant to individuals who are monitoring the health of their brand. To address these issues, preferably sentences are selected from news and blogs articles that contain matches to expert built Boolean searches that match content focused on a particular profile. The labelers are then asked to rate each sentence and provide a final aggregate evaluation.

FIG. 12 relates to a non-limiting example of a labeling worker message, while FIG. 13 relates to a non-limiting example of a labeling worker feedback page. To help workers adjust to the particular focus of the labeling task, and its differences from a more traditional sentiment analysis approach that focuses on the writer's emotions, feedback is provided through messages and pages. For example, individualized weekly feedback is provided based on aggregated final evaluations. Additionally each worker has access to monitor their cross polarity accuracy and neutral bias score.

Figure 14:
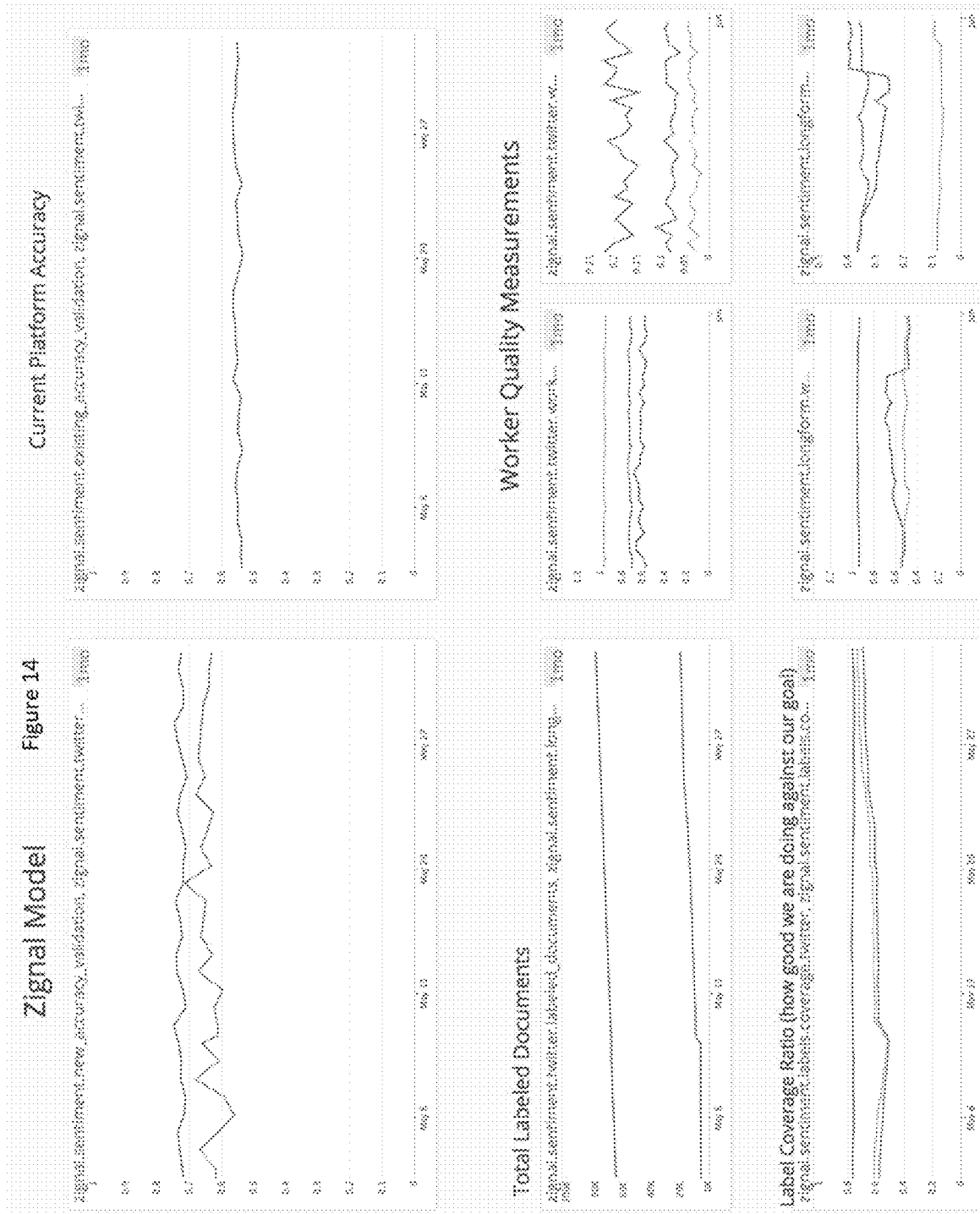
FIG. 14 shows results of tracking the sentiment system's accuracy and worker scores in a monitoring solution according to at least some embodiments of the present invention.

FIG. 14 shows results of tracking the sentiment system's accuracy and worker scores in a monitoring solution to be able to understand how the system behaves over time, and to explain and be aware of any performance changes. In this non-limiting example, results from a benchmark external platform for reviewing sentiment are considered with regard to the model's output as a comparison.

Figure 15:
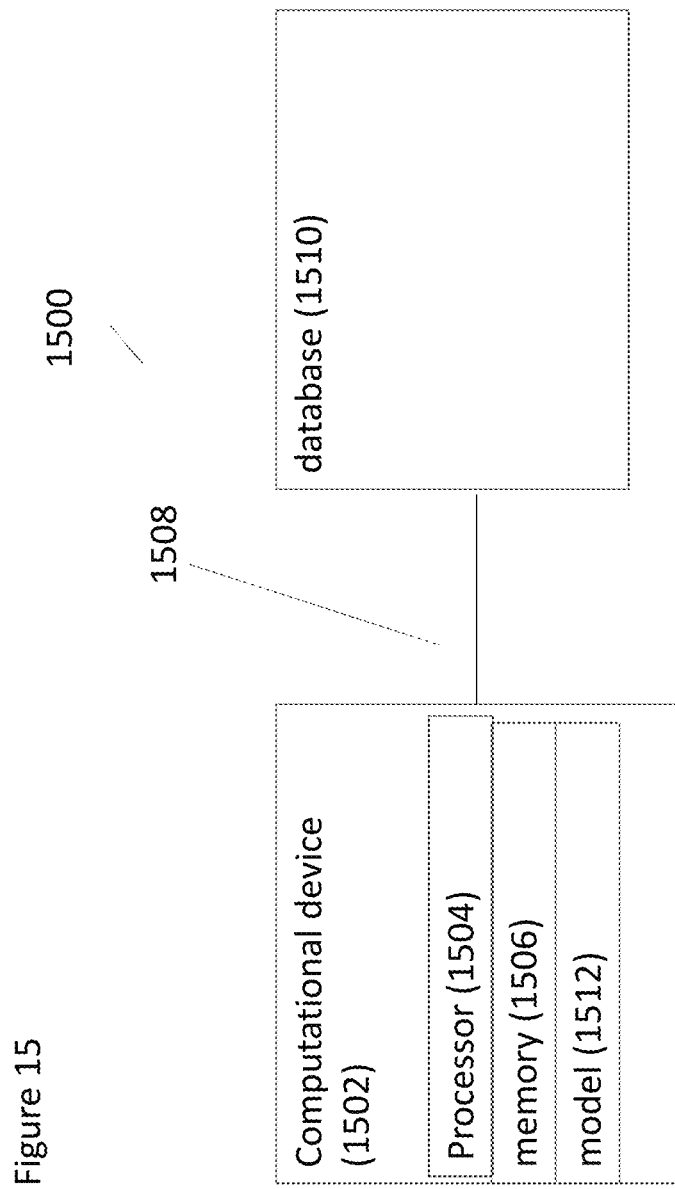
FIG. 15 shows a non-limiting, schematic exemplary system for monitoring sentiment analysis in a plurality of human communications such as for example, social media communications.

FIG. 15 shows a non-limiting, schematic exemplary system for monitoring sentiment analysis in a plurality of human communications such as for example, social media communications. The system preferably features a machine learning model, for example for analyzing word embeddings in a message from a social media channel, such as a tweet for example. This non-limiting example could optionally be used for any type of social media message analysis from any type of social media channel, for example according to the functions as described herein.

As shown, a system 1500 features a computational device 1502, operating a processor 1504 for executing a plurality of instructions from a memory 1506. As used herein, a processor such as processor 1504, generally refers to a device or combination of devices having circuitry used for implementing the communication and/or logic functions of a particular system. For example, a processor may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processor may further include functionality to operate one or more software programs based on computer-executable program code thereof, which may be stored in a memory, such as memory 1506 in this non-limiting example. As the phrase is used herein, the processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Social media messages may be obtained from a database 1510, for example after being retrieved from a social media message channel (not shown). Database 1510 is preferably in communication with computational device 1502 through a computer network 1508, such as the internet for example.

Computational device 1502 is also shown as operating a machine learning model 1512. Machine learning model 1512 is preferably implemented as instructions stored in memory 1506 and then executed by processor 1504. Machine learning model 1512 is shown separately for the sake of clarity in this diagram.

For example, processor 1504 may be implemented as a hardware processor configured to perform a predefined set of basic operations in response to receiving a corresponding basic instruction selected from a predefined native instruction set of codes, in which the codes are stored in memory 1506. The native instruction set of codes could for example be executed to support the implementation of machine learning model 1512, for example according to any suitable type of operating system. For example, the native instructions may be obtainable in or according to the instruction set architecture associated with computational device 1502.

For example and without limitation, computational device 1502 may be implemented as a multimedia computational device, comprising a first set of machine codes selected from the native instruction set for receiving a plurality of multimedia data items, such as social media messages for example; and a second set of machine codes selected from the native instruction set for dividing the plurality of multimedia data items into a training set and an analysis set.

The training set of data items, such as messages, could be labeled by hand, automatically or a combination thereof through a worker computational device. Computational device 1502 could be implemented as the worker computational device, in which case computational device 1502 would also comprise a display and an input device of some type, including but not limited to any type of pointing device (such as a mouse for example) and/or a keyboard. In such an implementation, computational device 1502 would comprise a first set of machine codes selected from the native instruction set for receiving and displaying at least one multimedia data item from the training set for labeling, and for providing a label for the at least one multimedia data item according to a reputation polarity of the at least one multimedia data item. If such labeling were to be performed automatically, it could be performed for example by model 1512.

Computational device 1502 could also be implemented as a monitoring computational device, comprising a first set of machine codes selected from the native instruction set for automatically analyzing the labels of said multimedia data items from said worker computational devices and for automatically determining a correct label for training a model; and a second set of machine codes selected from the native instruction set for automatically determining the reputation polarity of the analysis set according to a trained model. Such an automatic determination may be performed for example by model 1512.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for determining quality level of labeling of a plurality of multimedia data items, wherein the labels relate to reputation polarity, wherein reputation polarity comprises determining an impact of a statement on a reputation of a brand, perception of a brand, or a combination thereof; wherein said brand comprises a person, company, organization or other identifiable entity; the system comprising a plurality of worker computational devices for labeling the items, each worker computational device comprising a processor for executing instructions for labeling the items and a memory for storing the instructions; an analysis computational device for analyzing the labels to determine accuracy by calculating cross polarity accuracy scores and neutral bias scores for a plurality of labels for each item, and for providing feedback through said worker computational devices to increase accuracy of labeling; wherein said cross polarity accuracy score is determined at least partially according to a number of correct labels determined at each worker computational device; wherein said neutral bias score is at least partially determined according to a number of correct reputation polarity labels determined at each worker computational device; wherein said analysis computational device comprises an analysis processor for executing instructions for analyzing the labels and for providing feedback, and an analysis memory for storing the instructions; and a computer network for communication between said computational devices;

the system further comprising a model computational device for being trained on labeled multimedia data items to train a model to automatically determine reputation polarity by classifying an unlabeled multimedia data item, wherein said model computational device comprises a model processor for executing a plurality of instructions for automatically training a model to automatically determine reputation polarity of an unlabeled multimedia data item, and a model memory for storing said instructions; wherein said model to automatically determine reputation polarity receives said plurality of labeled multimedia data items and classifies said multimedia data items according to reputation polarity; wherein an error in correctly classifying said multimedia data items by said model is calculated and is used to adjust said model; wherein said training is repeated until a sufficiently low error is reached.

2. The system of claim 1, wherein said machine learning model is selected from the group consisting of recurrent and convolutional neural networks.

3. The system of claim 1, wherein said instructions comprise instructions for determining an accuracy of said labels on a numerical scale, wherein said feedback comprises a number on said numerical scale.

4. The system of claim 1, wherein said instructions for automatically training said model to form a trained model comprise instructions for training a model selected from the group consisting of recurrent and convolutional neural networks.

5. The system of claim 1, wherein said trained model comprises a network of neurons and wherein a layer of the network contains a plurality of neurons with linear activation, each neuron relating to a specific class, wherein a softmax determines a final class selection.

6. The system of claim 5, wherein said plurality of classes relates to a sentiment of a social media message, and wherein said plurality of classes comprises negative, neutral, and positive sentiment; wherein said sentiment comprises contribution of said social media message to polarity of reputation.

7. The system of claim 1, wherein said processor of each computational device comprises a hardware processor configured to perform a predefined set of basic operations in response to receiving a corresponding basic instruction selected from a predefined native instruction set of codes, and wherein said analysis computational device comprises a first set of machine codes selected from the native instruction set for receiving said labels for each item, a second set of machine codes selected from the native instruction set for analyzing said labels to determine if said labels are correct, and a third set of machine codes selected from the native instruction set for providing feedback on correctness of said labels.

8. The system of claim 7, wherein each worker computational device comprises a first set of machine codes selected from the native instruction set for receiving said items and a second set of machine codes selected from the native instruction set for supporting labeling of said items.

9. The system of claim 8, wherein said supporting labeling of said items comprises providing a display to a user operating said worker computational device to display each item and an input device for receiving a label for each item.

10. The system of claim 8, wherein said supporting labeling of said items comprises automatically labeling said items according to execution of a third set of machine codes.

11. The system of claim 1, wherein each worker computational device further comprises a display and a plurality of instructions stored in said memory, for receiving and displaying at least one multimedia data item from the training set for labeling, and for providing a label for the at least one multimedia data item according to a reputation polarity of the at least one multimedia data item.

12. The system of claim 11, further comprising a monitoring computational device, wherein said monitoring computational device is in communication with said computer network, wherein said monitoring computational device comprises a processor for executing instructions and a memory for storing said instructions, wherein said instructions comprise instructions for automatically analyzing said labels of said multimedia data items from said worker computational devices and for automatically determining a correct label for training a model; and wherein said instructions comprise instructions for automatically determining the reputation polarity of the analysis set according to a trained model.

13. The system of claim 1, wherein said multimedia data item comprises a social media message.

14. The system of claim 1, wherein a plurality of said multimedia data items is obtained from a plurality of data streams and wherein a selection of multimedia data items from one of said data streams is increased for training said model to automatically determine reputation polarity.

15. The system of claim 1, wherein said model to automatically determine reputation polarity is retrained at least intermittently on new labeled multimedia data items.

16. The system of claim 15, wherein said model to automatically determine reputation polarity is retrained continuously on a plurality of new labeled multimedia data items.

17. The system of claim 1, further comprising a data store for storing models;
wherein after training, said model is stored as a full package, said full package comprising inferred weights, model structure, word mappings, and metadata about quality of said model on validation and test data sets.

18. The system of claim 1, wherein said training further comprises calculating an output error for each batch of multimedia data items and backpropagating said error throughout said model, followed by adjusting said weights in a direction of said error.

19. The system of claim 18, further comprising applying dropout, wherein a percentage of said weights are randomly frozen for each batch of multimedia data items, and are not updated based on backpropagated error.

20. The system of claim 1, wherein said training is performed in a two step process, wherein a document comprises a plurality of segments, wherein said multimedia data items are labeled at an individual segment level and at an overall document level;
wherein said model is first optimized to predict classification of individual segments;
wherein a multi-segment classifier is constructed with said model, wherein said multi-segment classifier is trained according to labeled documents.

21. The system of claim 20, wherein said document comprises a plurality of sentences and wherein said plurality of segments comprises said plurality of sentences.

22. The system of claim 1, wherein said multimedia data item comprises a blog post or a news item.

23. The system of claim 1, further comprising a brand reputation monitor for preparing an analytical breakdown for determining an item selected from the group consisting of a time series by sentiment for a data stream, top authors by mention count, top sites by mention count, a word cloud for a given sentiment related to reputation polarity, an emoji cloud for a given sentiment related to reputation polarity.

24. The system of claim 1, wherein said cross polarity accuracy is calculated according to a sum of a number of incorrectly assigned polarity labels, multiplied by a total number of assigned labels by the worker as negative or positive, and a total number of labels that are negative or positive, and then divided by the total number of labels that are negative or positive.

25. The system of claim 1, wherein said neutral bias score is calculated according to a sum of a number of worker assigned labels that are neutral, multiplied by a total number of labels that are negative or positive, and divided by a total number of labels that are negative or positive.

* * * * *